US011314071B2

(12) United States Patent
Kim et al.

(10) Patent No.: US 11,314,071 B2
(45) Date of Patent: Apr. 26, 2022

(54) METHOD FOR GENERATING THREE-DIMENSIONAL SHAPE INFORMATION OF OBJECT TO BE MEASURED, DEFECT DETECTION METHOD, AND DEFECT DETECTION DEVICE

(71) Applicant: NAEILHAE, CO. LTD., Seongnam-si (KR)

(72) Inventors: Byung Mok Kim, Seoul (KR); Ji Hoon Kim, Seoul (KR); Mal Eum Sung, Seoul (KR); Sang Jin Lee, Seoul (KR)

(73) Assignee: Naeilhae, Co. Ltd., Seongnam-si (KR)

( * ) Notice: Subject to any disclaimer, the term of this patent is extended or adjusted under 35 U.S.C. 154(b) by 71 days.

(21) Appl. No.: 16/892,117

(22) Filed: Jun. 3, 2020

(65) Prior Publication Data
US 2020/0292989 A1    Sep. 17, 2020

Related U.S. Application Data

(63) Continuation of application No. PCT/KR2018/012805, filed on Oct. 26, 2018.

(30) Foreign Application Priority Data

Dec. 15, 2017 (KR) .......... 10-2017-0173034
Sep. 11, 2018 (KR) .......... 10-2018-0108525

(51) Int. Cl.
*G02B 21/00* (2006.01)
*G02B 5/32* (2006.01)
(Continued)

(52) U.S. Cl.
CPC .......... *G02B 21/0088* (2013.01); *G02B 5/32* (2013.01); *G03H 1/0866* (2013.01);
(Continued)

(58) Field of Classification Search
CPC .... G02B 21/0088; G02B 5/32; G02B 21/361; G02B 21/365; G02B 21/0056;
(Continued)

(56) References Cited

U.S. PATENT DOCUMENTS 10,564,603 B2 * 2/2020 Kim .............. G03B 35/24
11,016,443 B2 * 5/2021 Kim .............. G03H 1/0443
(Continued)

FOREIGN PATENT DOCUMENTS

JP    05-107357 A    4/1993
JP    2017-519985 A   7/2017
(Continued)

OTHER PUBLICATIONS

International Search Report and Written Opinion dated Feb. 28, 2019 in International Application No. PCT/KR2018/012805, in 9 pages.

(Continued)

*Primary Examiner* — Jade R Chwasz
(74) *Attorney, Agent, or Firm* — Knobbe Martens Olson & Bear LLP

(57) ABSTRACT

A method of generating three-dimensional (3D) shape information of an object to be measured from an image including intensity information of an object hologram generated by interference between a reference light reflected from an optical mirror and an object light affected by the object includes checking at least one frequency component included in the image and extracting real image components corresponding to a real image from the frequency component. The method also includes generating a correction light and a real image hologram based on the real image components, generating an intermediate hologram based on the correction light, and generating curvature aberration correction information from the intermediate hologram. The
(Continued)

method further includes generating a correction hologram based on the curvature aberration correction information and generating the 3D shape information of the object from the correction hologram.

9 Claims, 21 Drawing Sheets

(51) Int. Cl.
    *G03H 1/08*     (2006.01)
    *G03H 1/22*     (2006.01)

(52) U.S. Cl.
    CPC ..... *G03H 1/2249* (2013.01); *G03H 2001/226* (2013.01); *G03H 2210/30* (2013.01); *G03H 2223/24* (2013.01)

(58) Field of Classification Search
    CPC ............... G03H 1/0866; G03H 1/2249; G03H 2001/226; G03H 2210/30; G03H 2223/24; G03H 1/0443; G03H 2001/0825; G03H 1/0486; G03H 1/0808; G03H 2001/0441; G03H 2001/0875; G03H 2001/0083; G01B 9/021; G01B 11/25; G01N 21/88
See application file for complete search history.

(56) References Cited

U.S. PATENT DOCUMENTS

2010/0165429 A1*   7/2010   Buckley ............. G02B 27/0103
                                                            359/9
2017/0089837 A1*   3/2017   Matsumoto ............ G02B 21/08

FOREIGN PATENT DOCUMENTS

| KR | 10-2008-0097744 A | 11/2008 |
| KR | 10-2013-0042191 A | 4/2013 |
| KR | 10-2016-0029606 A | 3/2016 |
| KR | 10-2016-0123175 A | 10/2016 |
| KR | 10-2017-0120462 A | 10/2017 |
| KR | 10-2018-0010659 A | 1/2018 |

OTHER PUBLICATIONS

Office Action dated Jul. 9, 2019 in Korean Application No. 10-2018-0108525, in 5 pages.
Notice of Allowance dated Dec. 9, 2019 in Korean Application No. 10-2018-0108525, in 3 pages.

* cited by examiner

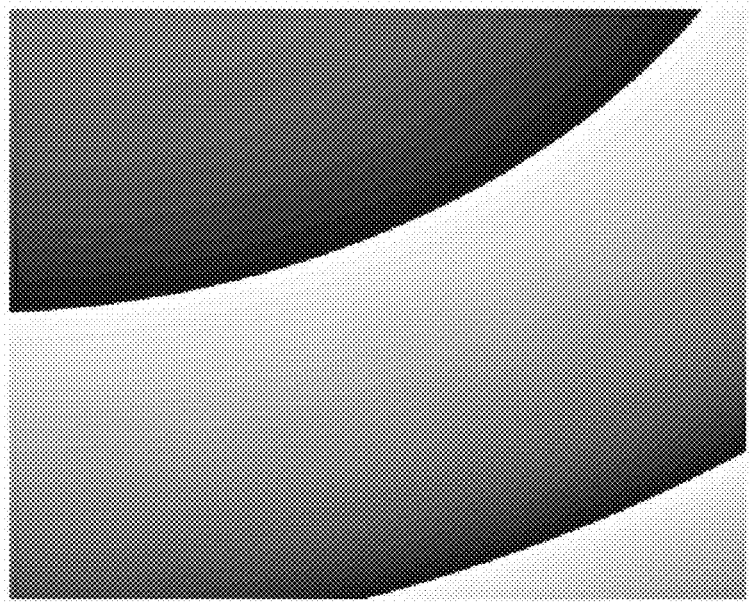

METHOD FOR GENERATING THREE-DIMENSIONAL SHAPE INFORMATION OF OBJECT TO BE MEASURED, DEFECT DETECTION METHOD, AND DEFECT DETECTION DEVICE

CROSS REFERENCE TO RELATED APPLICATIONS

This application is a continuation of International Patent Application No. PCT/KR2018/012805, filed on Oct. 26, 2018, which claims priority to Korean Patent Application Nos. 10-2017-0173034 filed on Dec. 15, 2017 and 10-2018-0108525 filed on Sep. 11, 2018, contents of all of which are incorporated herein by reference in their entireties.

BACKGROUND

Technical Field

The present disclosure relates to a method of generating three-dimensional (3D) shape information of an object to be measured. More particularly, the present disclosure relates to a method of generating 3D shape information of an object to be measured from an image including intensity information of an object hologram generated by interference between a reference light reflected from an optical mirror and an object light reflected from or passing through the object.

The present disclosure also relates to a defect detection method and device. More particularly, the present disclosure relates to a method and device for detecting a defect using 3D shape information and quantitative thickness information of an object, which are acquired using a holographic reconstruction device and method. According to the present disclosure, a problem of a complex optical device structure required for one-shot digital holography reconstruction using one object hologram image according to the related art and a problem of high cost involved in the complex optical device structure may be solved. A defect may be detected using holographic reconstruction with a simple structure and low cost. The present disclosure may be versatile to be applied to both reflection-type and transmission-type hologram reconstruction devices of the related art. In particular, reference light is not necessary during hologram reconstruction, and a quantitative 3D image of an object to be measured may be reconstructed in real time. The present disclosure may be applied to devices for detecting a defect in ultra-fine structures such as a thin-film transistor (TFT) and semiconductors, medical devices requiring display of an accurate 3D image, and other detection, checking, or display devices in various fields including detection of a refractive error in a transparent object like a lens.

Description of Related Technology

Digital holography microscopes refer to microscopes that acquire the shape of an object using digital holography.

While normal microscopes acquire the shape of an object by acquiring light reflected from the object, digital holography microscopes acquire interference light and/or diffraction light generated from an object and acquire the shape of the object from the interference light and/or the diffraction light.

Digital holography microscopes use, as a light source, a laser generating light of a single wavelength and split the light generated by the laser into two lights using an optical splitter. At this time, one light (hereinafter, referred to as a reference light) is directed to an image sensor, and the other light (hereinafter, referred to as an object light) is reflected from an object and directed to the image sensor such that interference occurs between the reference light and the object light.

The image sensor may record an interference pattern resulting from the interference in a digital image and reconstruct the three-dimensional (3D) shape of the object from the interference pattern. At this time, the interference pattern recorded by the image sensor may be commonly called a hologram.

Existing optical holography microscopes record an interference pattern, which results from the interference between a reference light and an object light, in a specialty film. When the reference light is emitted to the specialty film having the interference pattern recorded therein, the shape of an object to be measured is virtually reconstructed at a position where the object used to be located.

Compared to existing optical holography microscopes, digital holography microscopes digitize an interference pattern of light through an image sensor and reconstruct the shape of an object to be measured from interference pattern information using electronic calculations instead of an optical method.

Digital holography microscopes using a laser light source having a single wavelength according to the related art has a problem in that a minimum measurement unit for an object is limited to the wavelength of a laser. Digital holography microscopes using a laser light source having at least two wavelengths to solve the problem, according to the related art, have high manufacturing cost and may not acquire the 3D shape of an object in real time.

To reconstruct the shape of an object to be measured, these digital holography microscopes according to the related art generate a computer generated hologram (CGH) using a computer, display the CGH on a spatial light modulator (SLM), and acquire a 3D holographic image of the object by emitting reference light to the displayed shape. However, such methods require the use of an SLM which is expensive and have a clear technical limitation because they are just digitization of the specialty film of the optical holography microscopes described above.

SUMMARY

One aspect is to accurately generate three-dimensional (3D) shape information of an object to be measured by acquiring only one hologram.

Another aspect is to generate information about a reference light and curvature aberration information of an object light objective lens from one hologram and to correct the hologram of an object taking into account the information, thereby generating 3D shape information of an object to be measured with improved accuracy.

Another aspect is to solve a problem of a complex optical device structure and a resultant problem of high cost.

Another aspect is to detect defects in ultra-fine structures, such as a thin-film transistor (TFT) and semiconductors, at a high ratio by accurately acquiring the 3D shapes of the ultra-fine structures.

Another aspect is a method and device for detecting a defect using 3D shape information and quantitative thickness information of an object, which are acquired using an improved holographic reconstruction device. The improved holographic reconstruction device acquires only one object hologram image and reconstructs the 3D shape information and quantitative thickness information of the object using only the acquired object hologram image and a digital reference light generated from the acquired object hologram, without using a reference hologram image, thereby solving a problem of a complex optical device structure required for one-shot digital holography reconstruction using one object hologram image according to the related art and a problem of high cost involved in the complex optical device structure. The improved holographic reconstruction device may perform holographic reconstruction with a simple structure and low cost, may be versatile to be applied to both reflection-type and transmission-type hologram reconstruction devices of the related art, and particularly may not require the use of the reference hologram during hologram reconstruction and may reconstruct a quantitative 3D image of an object to be measured in real time and thus be applied to devices for detecting a defect in ultra-fine structures such as a TFT and semiconductors, medical devices requiring display of an accurate 3D image, and other detection, checking, or display devices in various fields including detection of a refractive error in a transparent object like a lens.

Another aspect is a method of generating three-dimensional (3D) shape information of an object to be measured from an image including intensity information of an object hologram generated by interference between a reference light reflected from an optical mirror and an object light affected by the object to be measured includes checking at least one frequency component included in the image; extracting real image components corresponding to a real image from the at least one frequency component; generating a correction light and a real image hologram based on the real image components, the correction light being in a conjugate relation with the reference light and the real image hologram including real image information of the object to be measured; generating an intermediate hologram based on the correction light, the intermediate hologram resulting from removing information of the reference light from the real image hologram; generating curvature aberration correction information from the intermediate hologram; generating a correction hologram based on the curvature aberration correction information, the correction hologram resulting from removing an error caused by a curvature aberration from the intermediate hologram; and generating the 3D shape information of the object to be measured from the correction hologram.

The generating of the curvature aberration correction information may include generating 3D shape information of the object to be measured from the intermediate hologram; determining at least one parameter based on the 3D shape information of the object to be measured, which is generated from the intermediate hologram, the at least one parameter determining the curvature aberration correction information; and generating the curvature aberration correction information based on the at least one parameter.

The 3D shape information of the object to be measured, which is generated from the intermediate hologram, may include at least a portion of a curved surface of a hemispherical shape, and the determining of the at least one parameter may include determining coordinates of a center of the curved surface of the hemispherical shape from the at least portion of the curved surface of the hemispherical shape; and determining a radius of the curved surface of the hemispherical shape from the at least portion of the curved surface of the hemispherical shape.

The determining of the at least one parameter may further include generating a cross-section cutting the curved surface of the hemispherical shape, the determining of the coordinates of the center may include determining the coordinates of the center from a curve generated on the cross-section by the curved surface of the hemispherical shape, and the determining of the radius of the curved surface may include determining the radius from the curve.

The cross-section may be parallel with a traveling direction of the object light.

According to a first feature of the present disclosure, a method of detecting a defect of an object to be measured includes calculating a compensated hologram of the object using a digital holographic microscope; extracting 3D phase information from the compensated hologram of the object; and determining whether the object is defective by applying the 3D phase information to a phase image defect detection convolutional neural network resulting from grouping convolutional filters.

According to a second feature of the present disclosure, a device for detecting a defect of an object to be measured includes a hologram measuring unit configured to measure hologram data of the object; and a controller configured to calculate a compensated hologram of the object, to extract 3D phase information from the compensated hologram of the object, and to determine whether the object is defective by applying the 3D phase information to a phase image defect detection convolutional neural network resulting from grouping convolutional filters.

According to the present disclosure, three-dimensional (3D) shape information of an object to be measured may be accurately generated by acquiring only one hologram.

In particular, 3D shape information of an object to be measured may be generated with improved accuracy by generating information about a reference light and curvature aberration information of an object light objective lens from one hologram and correcting the hologram of an object taking into account the information.

A problem of a complex optical device structure and a resultant problem of high cost may be solved.

Furthermore, defects in ultra-fine structures, such as a thin-film transistor (TFT) and semiconductors, may be detect at a high ratio by accurately acquiring the 3D shapes of the ultra-fine structures.

When the device and method of detecting a defect of an object to be measure according to the present disclosure are used, there may be the following advantageous effects:

1. A problem of a complex optical device structure required for one-shot digital holography reconstruction using one object hologram image according to the related art and a problem of high cost involved in the complex optical device structure may be solved.

2. Holographic reconstruction may be performed with a simple structure and low cost.

3. There may be versatility to be applied to both reflection-type and transmission-type hologram reconstruction devices of the related art.

4. In particular, the use of the reference hologram may not be required during hologram reconstruction, and a quantitative 3D image of an object to be measured may be reconstructed in real time.

5. The present disclosure may be applied to devices for detecting a defect in ultra-fine structures such as a TFT and semiconductors, medical devices requiring display of an accurate 3D image, and other detection, checking, or display devices in various fields including detection of a refractive error in a transparent object like a lens.

6. A lateral and axial defect (i.e., a 3D defect) of an object may be detected.

7. Defect detection may be automatized, and therefore, it is expected to save manufacturing cost and reduce the burden of expenses to customers.

Additional advantageous effects will be clearly understood from the descriptions below given with reference to the accompanying drawings, in which like reference numerals denote like elements.

BRIEF DESCRIPTION OF DRAWINGS

FIG. 7B is a diagram showing the phase of a reference light.

DETAILED DESCRIPTION

Figure 1:
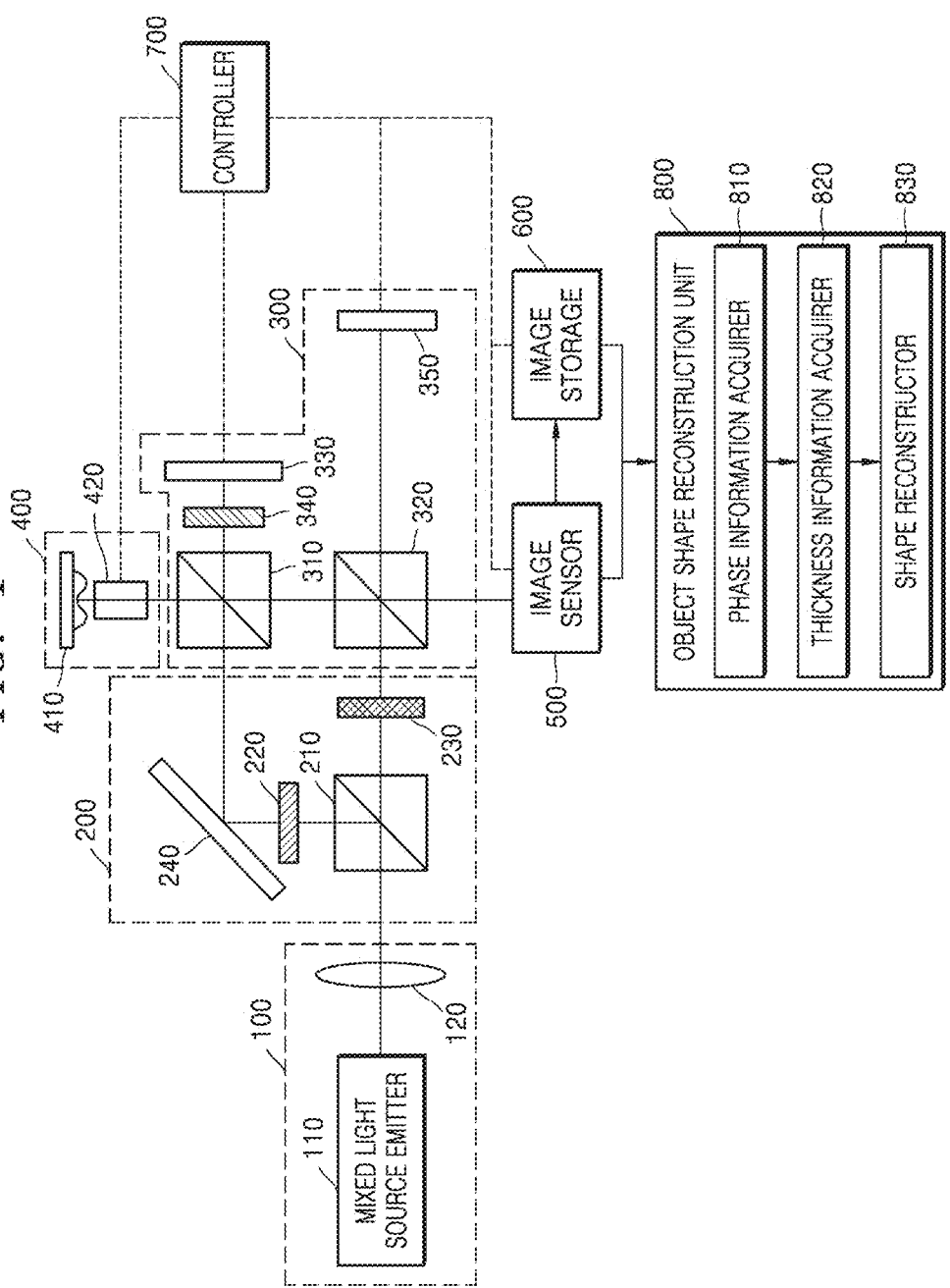
FIG. 1 is a detailed block diagram of a dual wavelength digital holography microscope apparatus.

FIG. 1 is a detailed block diagram of a dual wavelength digital holography microscope apparatus. Referring to FIG. 1, the dual wavelength digital holography microscope apparatus includes a mixed light source unit 100, a wavelength splitter 200, an interference patter acquiring unit 300, an object unit 400, an image sensor unit 500, an image storage unit 600, a controller 700, and an object shape reconstruction unit 800.

The mixed light source unit 100 includes a mixed light source emitter 110 and a light source lens 120. The mixed light source emitter 110 emits mixed light having a wavelength band distributed in a plurality of bands instead of a single band. The light source lens 120 optically controls the mixed light from the mixed light source emitter 110 and allows the mixed light to be incident to the wavelength splitter 200.

The wavelength splitter 200 includes a first optical splitter 210, a first filter 220, a second filter 230, and a first reflector 240. The first optical splitter 210 receives the mixed light from the mixed light source unit 100 and splits the mixed light into two lights. At this time, the first optical splitter 210 allows the incident mixed light to diverge in different directions. The first filter 220 receives one of the lights from the first optical splitter 210 and acquires a first beam having a predefined single wavelength. At this time, the light incident to the first filter 220 is filtered by the first filter 220, and the first beam having a single wavelength defined according to the characteristic of the first filter 220 is acquired. In the same manner as the first filter 220 operates, the second filter 230 receives the other of the lights from the first optical splitter 210 and acquires a second beam having a wavelength that is different from the wavelength of the first beam. The second beam is sent to the interference pattern acquiring unit 300. The first reflector 240 receives the first beam from the first filter 220 and reflects the first beam to the interference pattern acquiring unit 300.

The interference pattern acquiring unit 300 includes a second optical splitter 310, a third optical splitter 320, a second reflector 330, a third filter 340, and a third reflector 350. The second optical splitter 310 receives the first beam from the wavelength splitter 200 and splits the first beam into a first object light and a first reference light. At this time, the second optical splitter 310 allows the incident first beam to diverge in different directions. In the same manner as the second optical splitter 310 operates, the third optical splitter 320 receives and splits the second beam into a second object light and a second reference light. The second reflector 330 receives the first reference light and sends a first reflected reference light to the second optical splitter 310 by reflecting the first reference light. The third filter 340 may receive the first reference light from the second optical splitter 310, pass the first reference light to the second reflector 330, and receive and pass the first reflected reference light to the second optical splitter 310. When the second object light reaches the second optical splitter 310 and is thus split and partially directed to the second reflector 330, the third filter 340 blocks the second object light not to reach the second reflector 330. For this operation, the third filter 340 has the same characteristic as the first filter 220 in terms of light transmission. The third reflector 350 receives the second reference light and sends a second reflected reference light to the third optical splitter 320 by reflecting the second reference light. At this time, the second reflector 330 and the third reflector 350 are each configured to adjust an angle thereof under the control of the controller 700 such that an off-axis hologram is realized.

The first object light and the second object light acquired as described above are respectively converted into a first reflected object light and a second reflected object light before being sent to the image sensor unit 500 through the following procedure. The second optical splitter 310 allows the first object light to be incident to an object to be measured, which is loaded on the object unit 400, and also allows the second object light sent from the third optical splitter 320 to be incident to the object to be measured. In this case, light resulting from reflecting the first object light incident from the object to be measured is referred to as the first reflected object light. Light resulting from reflecting the second object light incident from the object to be measured is referred to as the second reflected object light. The second optical splitter 310 receives and transmits the first reflected object light and the second reflected object light to the third optical splitter 320. The third optical splitter 320 transmits the first reflected object light and the second reflected object light to the image sensor unit 500.

The first reflected reference light and the second reflected reference light acquired as described above are transmitted to the image sensor unit 500 through the following procedure. In detail, the second optical splitter 310 receives and transmits the first reflected reference light from the second reflector 330 to the third optical splitter 320. The third optical splitter 320 receives the first reflected reference light from the second optical splitter 310 and second reflected reference light from the third reflector 350 and transmits the first and second reflected reference lights to the image sensor unit 500. Accordingly, the first reflected object light, the first reflected reference light, the second reflected object light, and the second reflected reference light are transmitted from the third optical splitter 320 to the image sensor unit 500 and interfere with one another, thereby generating an interference pattern.

To form an off-axis system allowing beams of different wavelengths to form different interference patterns, the second reflector 330 and the third reflector 350 are characterized by adjusting the angle thereof in different directions under the control of the controller 700. In other words, when the angle of the second reflector 330 is different from the angle of the third reflector 350, there is a separation between the direction of the first reflected reference light from the second reflector 330 and the direction of the second reflected reference light from the third reflector 350. Accordingly, when the first reflected reference light and the second reflected reference light are combined with the first and second reflected object lights that have reached the image sensor unit 500 and an interference pattern is formed, a different off-axis interference pattern is formed for each wavelength.

The object unit 400 includes an object holder 410 and an objective lens 420. The object holder 410 fixes an object to be measured, and the objective lens 420 optically adjusts the first object light and the second object light, which are incident to the object to be measured.

The image sensor unit 500 projects the interference pattern acquired by the interference pattern acquiring unit 300 to a digital image sensor, measures the projected interference pattern using the digital image sensor, and converts a measured value into a discrete signal. The record of the interference pattern is usually called a hologram. For the digital image sensor, various kinds of image sensors including a charge coupled device (CCD) may be used.

The image storage unit 600 stores interference pattern information, which has been converted into the discrete signal by the image sensor unit 500, in various storage media such as memory devices or disk devices.

The controller 700 controls the interference patter acquiring unit 300 by, for example, adjusting the positions and angles of the second reflector 330 and the third reflector 350 to realize the off-axis system described above and acquire an interference pattern; controls the object unit 400 by, for example, adjusting the objective lens 420 to adjust the first and second object lights incident to an object to be measured; controls the image sensor unit 500 to measure the interference patter and convert interference pattern information into a discrete signal; and controls the image storage unit 600 to store the interference pattern information, which has been converted into the discrete signal.

The object shape reconstruction unit 800 includes a phase information acquirer 810, a thickness information acquirer 820, and a shape reconstructor 830. The phase information acquirer 810 acquires phase information of an interference pattern with respect to the first beam and phase information of an interference pattern with respect to the second beam using the interference pattern information. The thickness information acquirer 820 acquires thickness information of the object to be measured using the phase information. The shape reconstructor 830 reconstructs the 3D shape of the object to be measured using the thickness information. At this time, the thickness information of the object to be measured includes difference information of the route of an object light and the route of a reference light. Because of an optical route difference between the object light and the reference light, the interference pattern is formed when the object light overlaps the reference light.

According to the apparatus of FIG. 1, measurement resolution may be increased and real-time image acquisition may be secured, but there are still the problems described below.

Because a mixed light source having a wavelength band distributed in a plurality of bands is used in the apparatus of FIG. 1, the wavelength splitter 200 needs to use the first filter 220, the second filter 230, and the first reflector 240 to acquire at least two single wavelengths by splitting the first and second beams respectively having different wavelengths.

In addition, the interference pattern acquiring unit 300 needs to use the third optical splitter 320 to split the second beam, the third reflector 350 to reflect the second beam, and the third filter 340 to block the second beam from being incident to the second reflector 330.

Accordingly, the structure of a microscope is complex, which leads various problems such as an increase in manufacturing cost and an increase in design complexity. Therefore, new approaches for solving those problems while using a light source of a single wavelength are desired.

The new approaches are also desired to be applicable to devices for detecting a defect in ultra-fine structures such as a thin-film transistor (TFT) and semiconductors, medical devices requiring display of an accurate 3D image, and other detection, checking, or display devices in various fields including detection of a refractive error in a transparent object like a lens.

According to an embodiment, a method of generating three-dimensional (3D) shape information of an object to be measured from an image including intensity information of an object hologram generated by interference between a reference light reflected from an optical mirror and an object light affected by the object to be measured includes checking at least one frequency component included in the image; extracting real image components corresponding to a real image from the at least one frequency component; generating a correction light and a real image hologram based on the real image components, the correction light being in a conjugate relation with the reference light and the real image hologram including real image information of the object to be measured; generating an intermediate hologram based on the correction light, the intermediate hologram resulting from removing information of the reference light from the real image hologram; generating curvature aberration correction information from the intermediate hologram; generating a correction hologram based on the curvature aberration correction information, the correction hologram resulting from removing an error caused by a curvature aberration from the intermediate hologram; and generating the 3D shape information of the object to be measured from the correction hologram.

As embodiments allow for various changes and numerous embodiments, example embodiments will be illustrated in the drawings and described in detail in the written description. Advantageous effects, features, and methods for achieving the effects and features will become more apparent by explaining the embodiments in detail with reference to the accompanying drawings. However, the present disclosure is not limited to these embodiments but may be realized in various modes.

The embodiments of the present disclosure will now be described more fully with reference to the accompanying drawings. Like reference numerals in the drawings denote like elements, and thus their description will be omitted.

The terms first, second, etc. are used in the description of the embodiments to only distinguish one element from another. As used herein, the singular forms "a", "an" and "the" are intended to include the plural forms as well, unless the context clearly indicates otherwise. It will be further understood that the terms "comprises" and/or "comprising," or "includes" and/or "including", when used in this specification, specify the presence of stated features or elements, but do not preclude the presence or addition of one or more other features or elements. In the drawings, the size of elements may be exaggerated or reduced for clarity. For instance, the size and shape of each element may be arbitrarily illustrated in the drawings, and therefore, the present disclosure is not limited to the drawings.

Figure 2A:
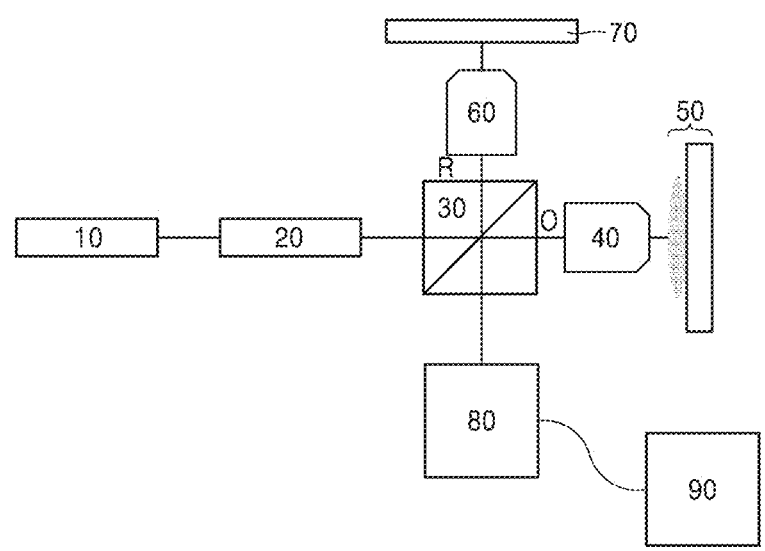
FIG. 2A is a block diagram illustrating the schematic configuration of a holography reconstruction device according to a first embodiment of the present disclosure.

FIG. 2A is a block diagram illustrating the schematic configuration of a holography reconstruction device 1A according to a first embodiment of the present disclosure.

In the present disclosure, a "holography reconstruction device" may refer to a device that acquires a hologram of an object to be measured (hereinafter, described as an "object hologram") and analyzes and/or displays the acquired object hologram.

For example, the holography reconstruction device 1A may be a device that is provided in a semiconductor manufacturing line to acquire an object hologram of a produced semiconductor and determine the integrity of the semiconductor from the acquired object hologram. However, this is just an example, and embodiments are not limited thereto.

In the present disclosure, an "object hologram" may refer to a hologram that may be generated from an image acquired by the holography reconstruction device 1A and has not undergone various processes of the holography reconstruction device 1A. This will be described in detail below.

Referring to FIG. 2A, the holography reconstruction device 1A according to the first embodiment may include a light source unit 10 emitting a single-wavelength light, a collimator 20 collimating the single-wavelength light emitted from the light source unit 10, an optical splitter 30 splitting the single-wavelength light passed through the collimator 20 into an object light O and a reference light R, an object light objective lens 40 passing the object light O from the optical splitter 30, a reference light objective lens 60 passing the reference light R from the optical splitter 30, an optical mirror 70 reflecting the reference light R passed through the reference light objective lens 60, an image sensor 80, and a processor 90 processing an image acquired by the image sensor 80. The image sensor 80 records the image that is formed when the object light O, which has passed through the object light objective lens 40 and then reflected from a surface of an object 50 to be measured, and the reference light R, which has been reflected from the optical mirror 70, are transmitted to the optical splitter 30 after respectively passing through the object light objective lens 40 and the reference light objective lens 60.

At this time, the processor 90 may generate three-dimensional (3D) information of the object 50 to be measured from the image acquired by the image sensor 80. The operation of the processor 90 will be described in detail below.

Figure 2B:
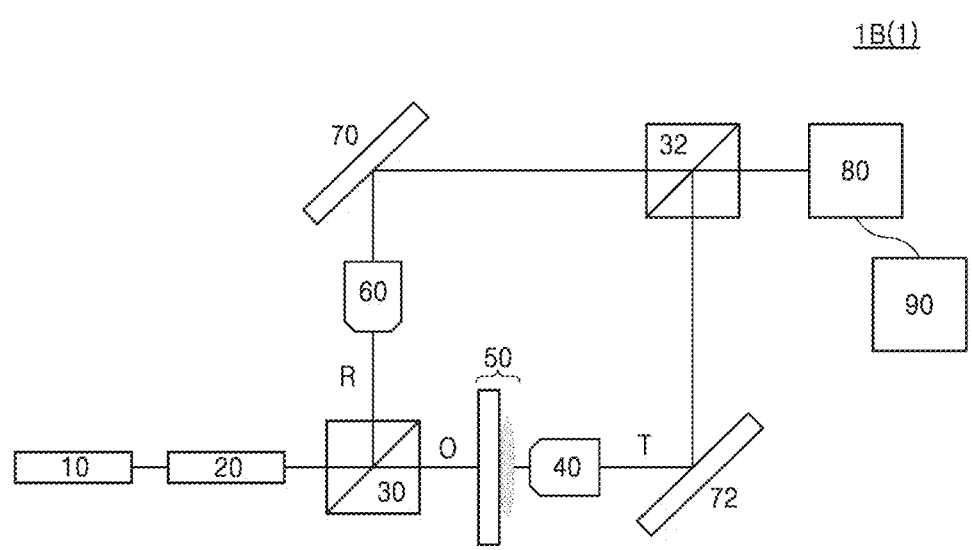
FIG. 2B is a block diagram illustrating the schematic configuration of a holography reconstruction device according to a second embodiment of the present disclosure.

FIG. 2B is a block diagram illustrating the schematic configuration of a holography reconstruction device 1B according to a second embodiment of the present disclosure.

Referring to FIG. 2B, the holography reconstruction device 1B according to the second embodiment may include the light source unit 10 emitting a single-wavelength light; the collimator 20 collimating the single-wavelength light emitted from the light source unit 10; the optical splitter 30 splitting the single-wavelength light passed through the collimator 20 into the object light O and the reference light R; the object light objective lens 40 passing an object transmitted light T including information about the object 50 to be measured, the object transmitted light T resulting when the object light O from the optical splitter 30 has passed through the object 50 to be measured; a second optical mirror 72 reflecting the object transmitted light T passed through the object light objective lens 40; the reference light objective lens 60 passing the reference light R from the optical splitter 30; the first optical mirror 70 reflecting the reference light R passed through the reference light objective lens 60; a second optical splitter 32 receiving the reference light R reflected from the first optical mirror 70 and the object transmitted light T reflected from the second optical mirror 72; the image sensor 80 recording an image formed by the reference light R and the object transmitted light T, which are received from the second optical splitter 32; and the processor 90 processing the image acquired by the image sensor 80.

In the second embodiment, the processor 90 may also generate 3D information of the object 50 to be measured from the image acquired by the image sensor 80. The operation of the processor 90 will be described in detail below.

The holography reconstruction device 1A according to the first embodiment of FIG. 2A has substantially the same configuration as the holography reconstruction device 1B according to the second embodiment of FIG. 2B, except that the object light O is reflected from the object 50 to be measured (the embodiment of FIG. 2A) or passes through the object 50 to be measured (the embodiment of FIG. 2B) and excepting for some elements (e.g., additional use of the second optical mirror 72 and the second optical splitter 32 in FIG. 2B and the resultant arrangement of some elements).

In particular, it will be noted that the holography reconstruction devices 1A and 1B have the same features in that an image is acquired by the image sensor 80 and the processor 90 generates the reference light R from the acquired image.

Hereinafter, the holography reconstruction devices 1A and 1B respectively according to the first and second embodiments are collectively named a holography reconstruction device 1.

According to an embodiment, the processor 90 of the holography reconstruction device 1 may include any type of devices that may process data. For example, the processor 90 may refer to a data processing device, which is embedded in hardware and has a circuit physically structured to perform a function expressed as code or a command, each included in a program.

Examples of the data processing device embedded in hardware may include processing devices such as a microprocessor, a central processing unit (CPU), a processor core, a multiprocessor, an application-specific integrated circuit (ASIC), and a field programmable gate array (FPGA), but embodiments are not limited thereto.

According to an embodiment, the image sensor 80 may include at least one image sensor, e.g., a charge coupled device (CCD) or a complimentary metal-oxide semiconductor (CMOS).

Figure 3A:
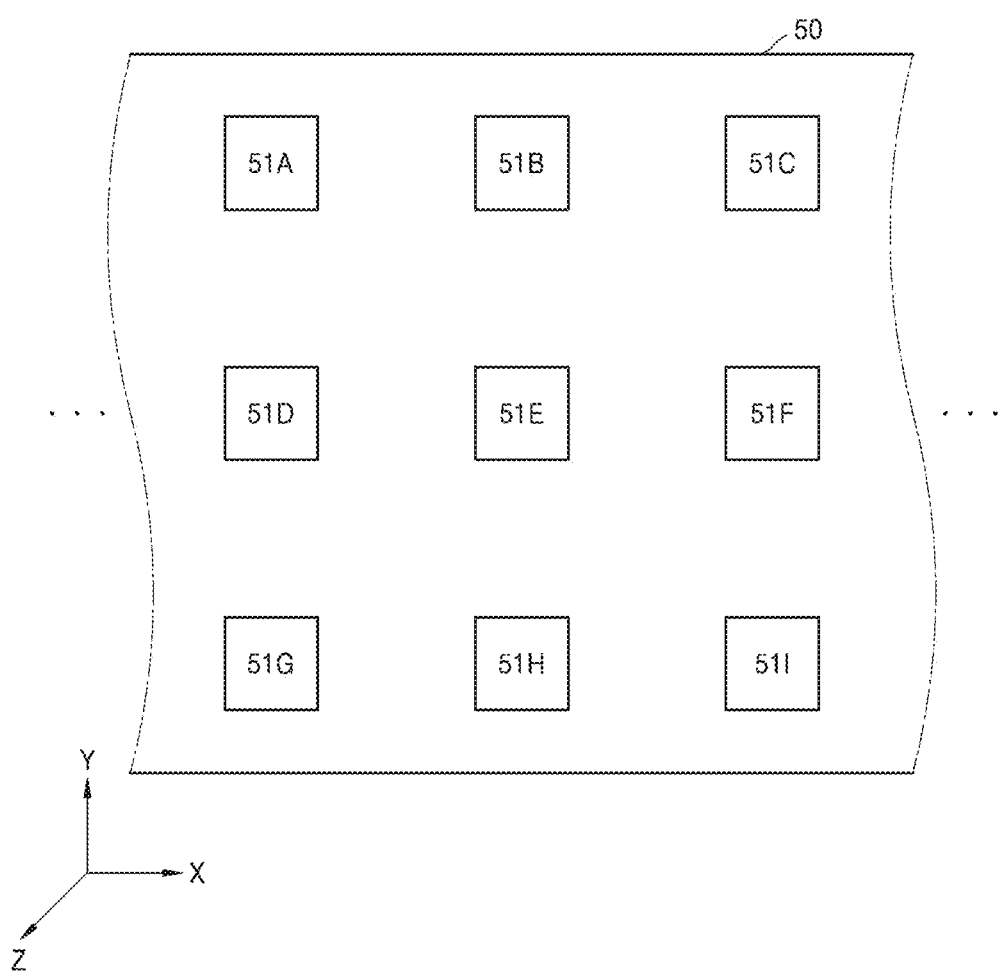
FIGS. 3A and 3B are diagrams for describing the outer shape of an example of an object to be measured.
Figure 3B:
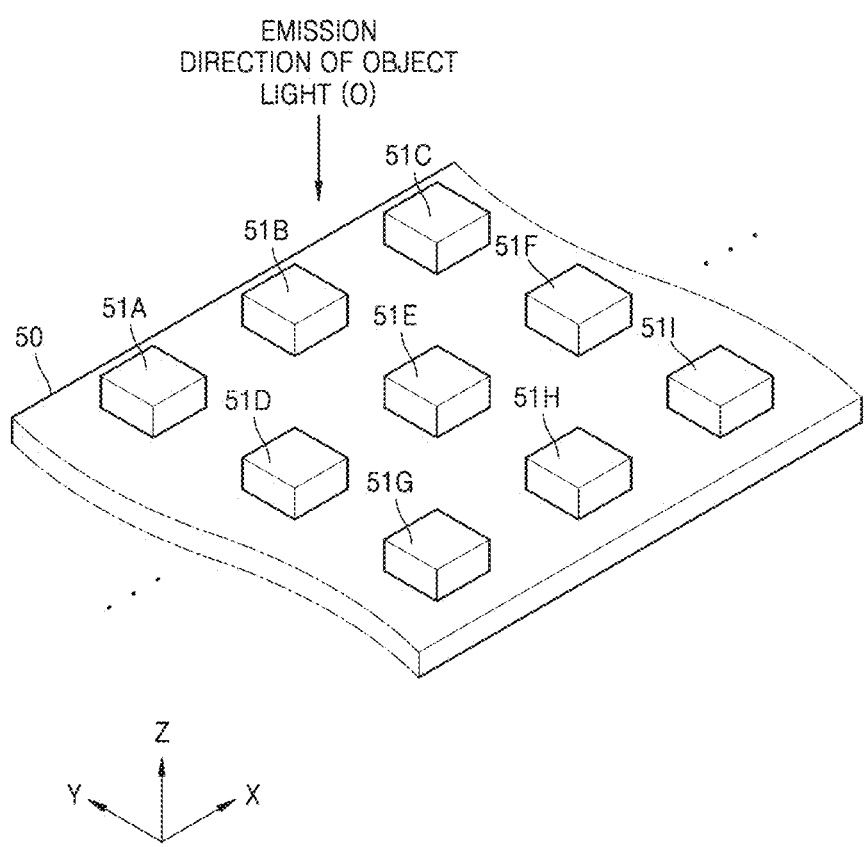

FIGS. 3A and 3B are diagrams for describing the outer shape of an example of the object 50 to be measured.

As shown in FIGS. 3A and 3B, the object 50 to be measured may include cuboid structures 51A through 51I spaced apart from each other by a certain distance on one surface thereof. In other words, the object 50 to be measured may include the cuboid structures 51A through 51I protruding in a Z direction from a surface parallel with an X-Y plane.

Hereinafter, it is assumed that the holography reconstruction device 1 acquires an image of the object 50 to be measured by emitting the object light O in a direction perpendicular to the surface of the object 50 to be measured, on which the cuboid structures 51A through 51I are arranged.

According to an embodiment, the image sensor 80 may acquire the image of the object 50 to be measured.

In the present disclosure, the "image" of the object 50 to be measured may include intensity information (i.e., $|U0(x,y,0)|^2$) of an object hologram $U0(x,y,0)$ of the object 50 to be measured at each position and may be expressed as Equation 1:

$$|U0(x,y,0)|^2 = |O(x,y)|^2 + |R(x,y)|^2 + O^*(x,y)R(x,y) + O(x,y)R^*(x,y)$$ [Equation 1]

Here, the object hologram $U0(x,y,0)$ represents phase information of the object 50 to be measured at each spot (x,y), x and y are coordinates in a space in which the object 50 to be measured is located and represent coordinates defining a plane perpendicular to the object light O, $O(x,y)$ and $R(x,y)$ respectively represent the object light O and the reference light R, and $O^*(x,y)$ and $R^*(x,y)$ respectively represent the complex conjugate of the object light O and the complex conjugate of the reference light R.

Figure 4:
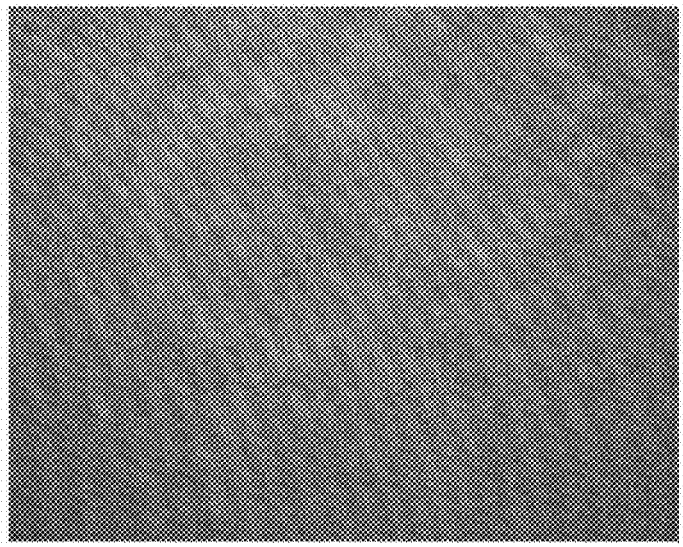
FIG. 4 illustrates an example of an image of a portion of an object to be measured.

For example, the image sensor 80 may acquire an image shown in FIG. 4 with respect to a portion (e.g., including 51A and 51B) of the object 50 to be measured, which is illustrated in FIGS. 3A and 3B.

The image acquired by the image sensor 80 includes the intensity information of the object hologram $U0(x,y,0)$ at each position, as described above, and may thus be different from an image of the object 50 to be measured, which is usually acquired by the image sensor 80 (i.e., which is captured using only the object light O).

Referring to Equation 1, the object hologram $U0(x,y,0)$ may be generated by interference between the object light O, which includes phase information of the object 50 to be measured at each spot, and the reference light R, which does not include the phase information of the object 50 to be measured.

In addition to the phase information (i.e., the height information) of the object 50 to be measured at each spot (i.e., each spot (x,y)), the object hologram $U0(x,y,0)$ may further include an error caused by the aberration of the object light objective lens 40, noise (e.g., speckle noise resulting from the use of a photon of a laser), and the like.

Therefore, to remove the error and noise from the image acquired by the image sensor 80, the processor 90 may perform the various operations described below.

According to an embodiment, the processor 90 may check frequency components of the image acquired by the image sensor 80. For example, the processor 90 may check the frequency components of the image by performing two-dimensional (2D) Fourier transform on the image.

In other words, the processor 90 may check frequency components included in the image including the intensity information (i.e., $|U0(x,y,0)|^2$) of the object hologram $U0(x,y,0)$ at each position. At this time, the image may include a frequency component corresponding to a real image, a frequency component corresponding to an imaginary image, and a direct current (DC) component.

Other various components than three types of components (i.e., the frequency component corresponding to a real image, the frequency component corresponding to an imaginary image, and the DC component) described above may also be included in the image. For example, frequency components involved in noise may also be included in the image. However, this is just an example, and embodiments are not limited thereto.

According to an embodiment, the processor 90 may extract components only corresponding to a real image from the checked frequency components. At this time, the processor 90 may extract the components corresponding to the real image in various ways.

For example, the processor 90 may extract components (hereinafter, referred to as peak components) having a peak value in terms of magnitude among frequency components included in an image and may extract, as components corresponding to a real image, components having a certain frequency difference or less from a peak component corresponding to the real image among the extracted peak components.

At this time, the processor 90 may determine the components corresponding to the real image based on the peak component corresponding to the real image in various ways. For example, the processor 90 may determine frequency components within a cross region around the peak component corresponding to the real image as the components corresponding to the real image. However, this is just an example, and embodiments are not limited thereto.

In a selective embodiment, the processor 90 may extract components only corresponding to a real image among frequency components included in a hologram using an automatic real image spot-position extraction algorithm.

In the present disclosure, "extracting" a certain frequency component may refer to extracting the frequency of the certain frequency component and the magnitude (or intensity) of the certain frequency component.

Figure 5:
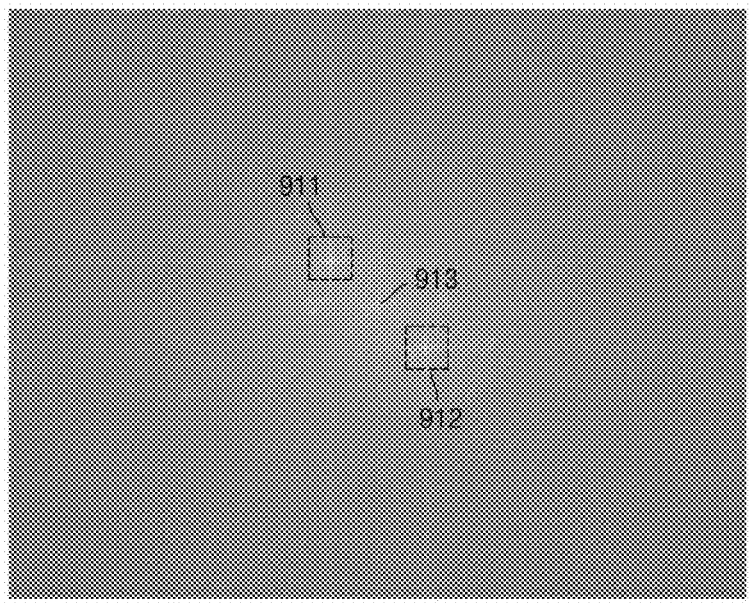
FIG. 5 is a diagram of frequency components of the image of the portion of the object to be measured in FIG. 4.

FIG. 5 is a diagram of frequency components of the image of a portion of the object 50 to be measured in FIG. 4.

As described above, the processor 90 may check frequency components of an image acquired by the image sensor 80 and thus check various frequency components including a frequency component 911 corresponding to a real image, a frequency component 912 corresponding to an imaginary image, and a DC component 913.

Figure 6:
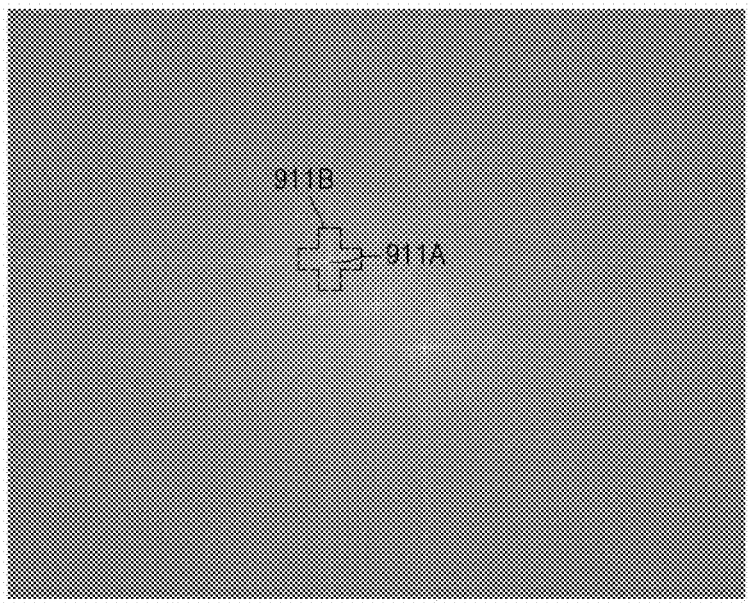
FIG. 6 is a diagram for describing a method of extracting frequency components corresponding to a real image from the frequency components of FIG. 5.

The processor 90 may also extract only the frequency component 911 corresponding to the real image among the checked components. At this time, for example, the processor 90 may determine, as components corresponding to the real image, frequency components 911B within a cross region around a peak component 911A corresponding to the real image, as shown in FIG. 6.

According to an embodiment, the processor 90 may generate a digital reference light from frequency components corresponding to a real image, which are extracted through the procedure described above. In detail, the processor 90 may calculate a propagation direction and wavenumber of the digital reference light based on the frequency components corresponding to the real image. In other words, the processor 90 may calculate a wave vector of the digital reference light.

The processor 90 may also generate a digital reference light based on the propagation direction and wavenumber (or wave vector) of the digital reference light and may generate a correction light (Rc(x,y)) by obtaining a conjugate term of a digital reference light (R(x,y)) generated as shown in Equation 2:

$$Rc(x,y)=\text{conj}[R(x,y)] \qquad \text{[Equation 2]}$$

At this time, R(x,y) represents a digital reference light generated based on frequency components corresponding to a real image, and Rc(x,y) represents a correction light.

Figure 7A:
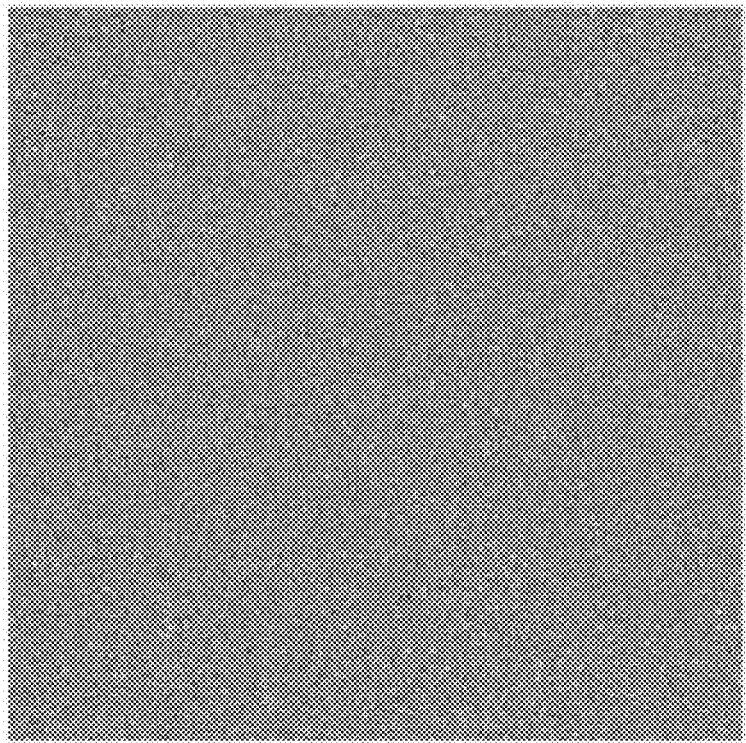
FIG. 7A is a diagram showing the intensity of a digital reference light.
Figure 7C:
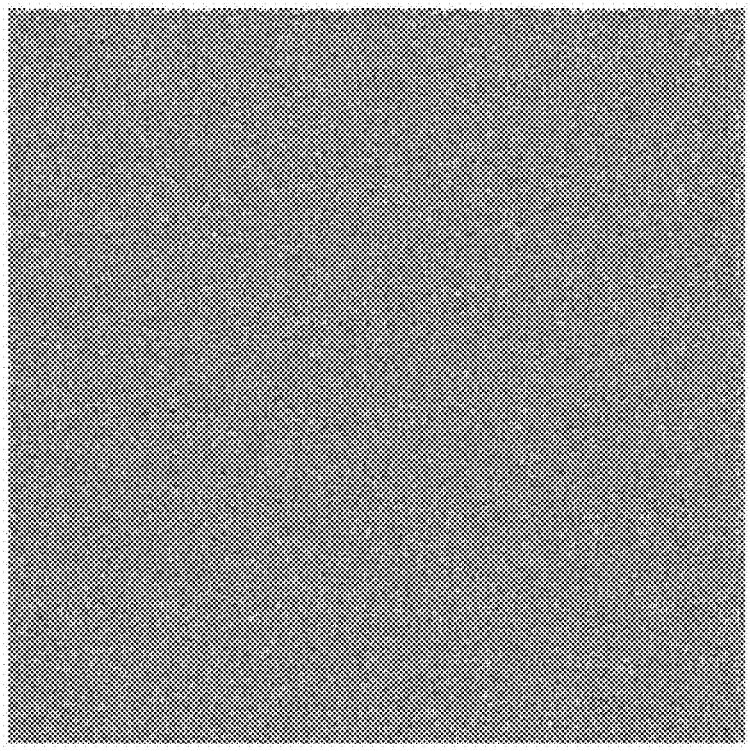
FIG. 7C is a diagram showing the intensity of a correction light.
Figure 7D:
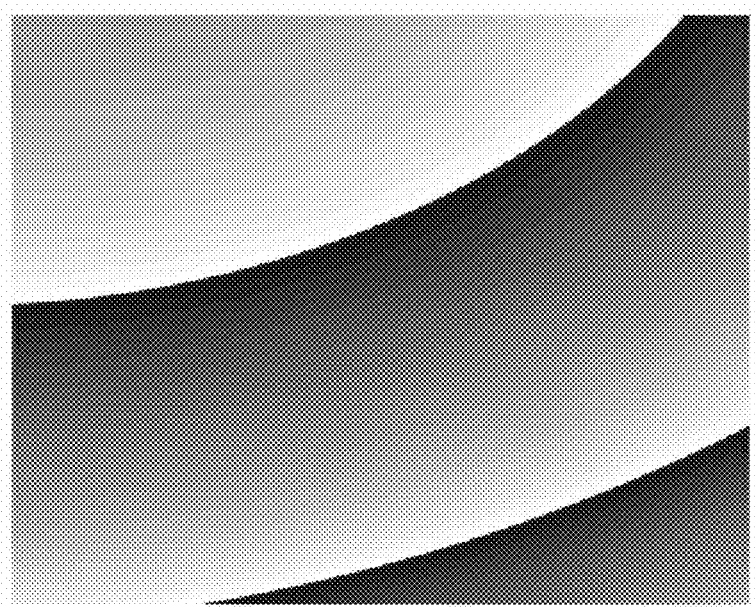
FIG. 7D is a diagram showing the phase of a correction light.

The digital reference light R(x,y) and the correction light Rc(x,y) are in a conjugate relation with each other and may thus have the same intensity as shown in FIGS. 7A and 7C and have opposite phases to each other as shown in FIGS. 7B and 7D. Here, FIG. 7A is a diagram showing the intensity of the digital reference light R(x,y), FIG. 7B is a diagram showing the phase of the digital reference light R(x,y), FIG. 7C is a diagram showing the intensity of the correction light Rc(x,y), and FIG. 7D is a diagram showing the phase of the correction light Rc(x,y).

The correction light Rc(x,y) may be used to correct a real image hologram Um(x,y,0) described below.

Meanwhile, a "digital reference light" has the same properties as the reference light R generated from a single-wavelength light and may be a virtual light reconstructed by the processor 90 from an image acquired by the image sensor 80.

Figure 8:
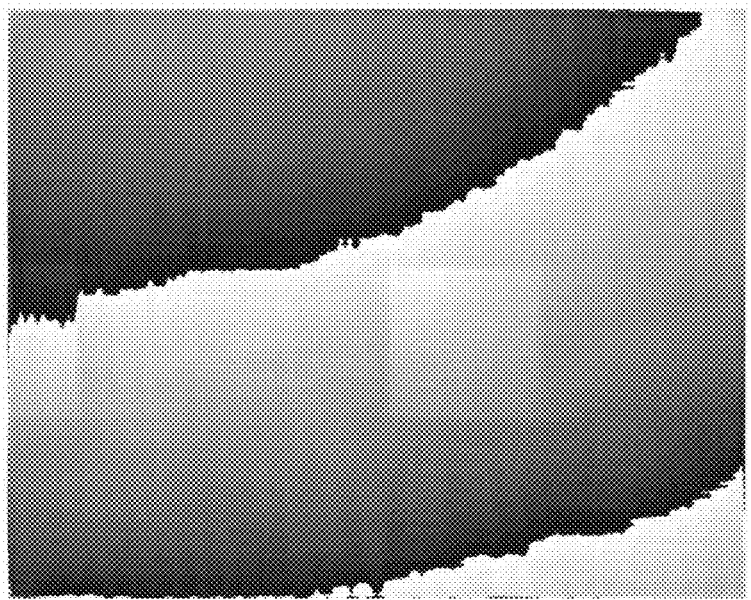
FIG. 8 is a diagram showing an example of a real image hologram.

According to an embodiment, the processor 90 may generate a real image hologram based on the frequency components corresponding to the real image, which are extracted through the procedure described above. For example, the processor 90 may generate a real image hologram of FIG. 8 by performing inverse 2D Fourier transform on the frequency components corresponding to the real image.

At this time, the real image hologram may be expressed as Equation 3:

$$Um(x,y,0)=O(x,y)R^*(x,y) \qquad \text{[Equation 3]}$$

Here, Um(x,y,0) represents the real image hologram, O(x,y) represents the object light O, and R*(x,y) represents the complex conjugate of the reference light R.

The real image hologram Um(x,y,0) may include information about the height of the object 50 to be measured, information about the reference light R, and an error caused by the aberration of the object light objective lens 40.

Accordingly, the processor 90 may generate a correction hologram Uc(x,y,0) from the real image hologram Um(x,y,0), taking into account an influence of the reference light R and an error caused by the aberration of the object light objective lens 40.

For example, the processor 90 may generate the correction hologram Uc(x,y,0) by multiplying the real image hologram Um(x,y,0) by a term Rc(x,y) related to a correction light and a term Rca(x,y) related to curvature aberration correction, as shown in Equation 4:

$$Uc(x,y,0)=Um(x,y,0)Rc(x,y)Rca(x,y) \qquad \text{[Equation 4]}$$

Here, Uc(x,y,0) represents the correction hologram without the information about the reference light R and aberration information of the object light objective lens 40, Um(x,y,0) represents the real image hologram, Rc(x,y) represents the term related to a correction light, and Rca(x,y) represents the term related to curvature aberration correction.

According to an embodiment, the processor 90 may generate the term Rca(x,y) related to curvature aberration correction using various methods.

For example, the processor 90 may generate the 3D shape of the object 50 to be measured from a hologram (hereinafter, referred to as an intermediate hologram) obtained by multiplying the real image hologram Um(x,y,0) by the term Rc(x,y) related to a correction light and may generate the term Rca(x,y) related to curvature aberration correction from the 3D shape.

In detail, the processor 90 may determine at least one parameter, which determines a curvature aberration correction term, from the 3D shape of the object 50 to be measured, which is generated from an intermediate hologram. At this time, the parameter may include, for example, coordinates of a center and a radius, which define the curved surface of a hemispherical shape.

Figure 9:
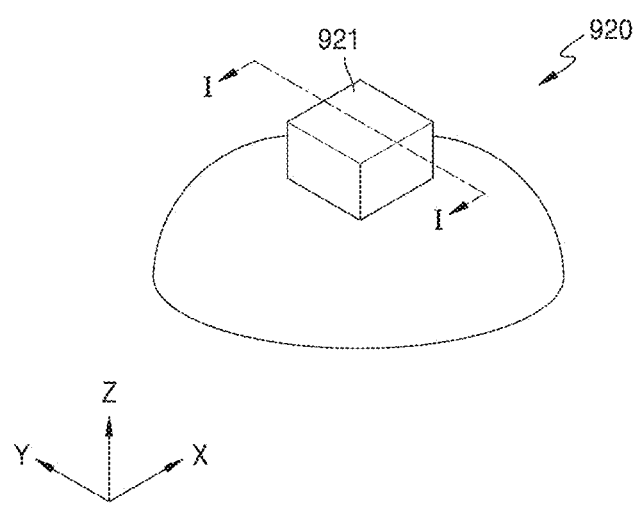
FIGS. 9 and 10 are diagrams for describing a method of determining a curvature aberration correction term from an intermediate hologram using a processor, according to an embodiment of the present disclosure.
Figure 10:
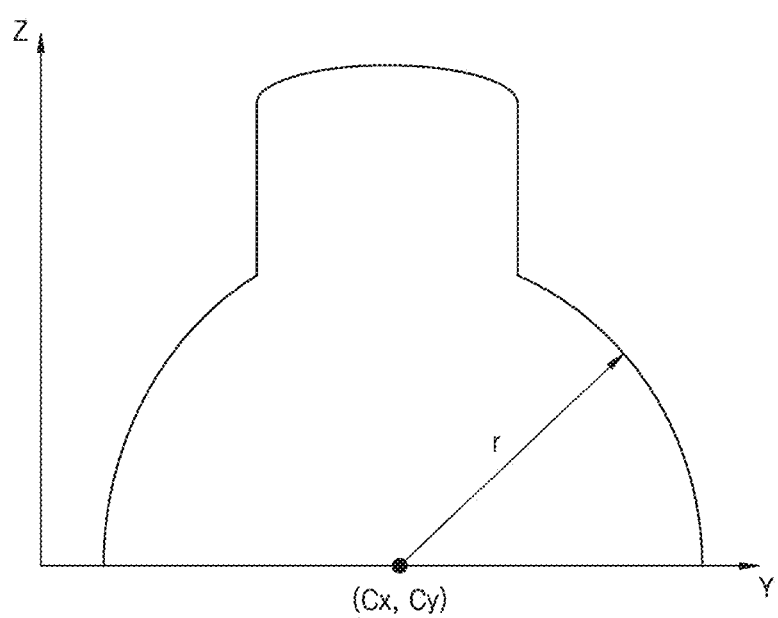

FIGS. 9 and 10 are diagrams for describing a method of determining a curvature aberration correction term from an intermediate hologram using the processor 90, according to an embodiment of the present disclosure.

For convenience of description, it is assumed that the image sensor 80 has acquired an image of the cuboid structure 51D and the processor 90 has generated an intermediate hologram of the cuboid structure 51D through the procedure described above. It is also assumed that a 3D shape 920 of the cuboid structure 51D, which is generated from the intermediate hologram of the cuboid structure 51D, is shown in FIG. 9.

Under those assumptions, the processor 90 according to an embodiment may determine at least one parameter, which determines a curvature aberration correction term, from the 3D shape 920. For example, as shown in FIG. 10, the processor 90 may determine, as parameters, a coordinate (Cx,Cy) of the center of the curved surface of a hemispherical shape and a radius "r" of the curved surface, from a curve of a cross-section of the 3D shape 920, taken along line I-I. At this time, the processor 90 may determine the position and/or direction of a cutting line, e.g., line I-I, such that the cutting line includes the center of the 3D shape 920 (i.e., the center of the hemispherical shape). In addition, the processor 90 may determine the cutting line, e.g., line I-I, to be parallel with the travelling direction of the object light O.

According to an embodiment, the processor 90 may generate (or determine) a curvature aberration correction term based on the at least one parameter determined through the above-described procedure. For example, the processor 90 may generate a curved surface in a 3D space with reference to the coordinate (Cx,Cy) of the center of the curved surface and the radius "r" of the curved surface and generate information to be reflected to phase correction of each spot (x,y) from the generated curved surface, thereby generating (or determining) the curvature aberration correction term.

In a selective embodiment, the processor 90 may determine a correction term from an intermediate hologram of an object to be measured, of which the shape is known, (e.g., an object having the same "z" value at any x and y coordinates).

In the case of the object to be measured, of which the shape is known, a "z" value at each spot (x,y) is given, and therefore, the processor 90 may determine a correction term by checking a difference in the "z" value at each spot (x,y) between the 3D shape of an object to be measured, which is generated from an intermediate hologram, and the known shape of the object to be measured. However, this is just an example, and embodiments are not limited thereto.

According to an embodiment, the processor 90 may generate a 3D shape of the object 50 to be measured based on the correction hologram $U_c(x,y,0)$. In other words, the processor 90 may calculate a height of an object in the Z direction at each spot (x,y).

For example, the processor 90 may convert the correction hologram $U_c(x,y,0)$ into information of a reconstruction image plane. At this time, the reconstruction image plane refers to a virtual image display plane corresponding to a distance between the object 50 to be measured and the image sensor 80, which is calculated by the processor 90. The reconstruction image plane may be a virtual plane calculated and simulated by the processor 90.

Figure 11:
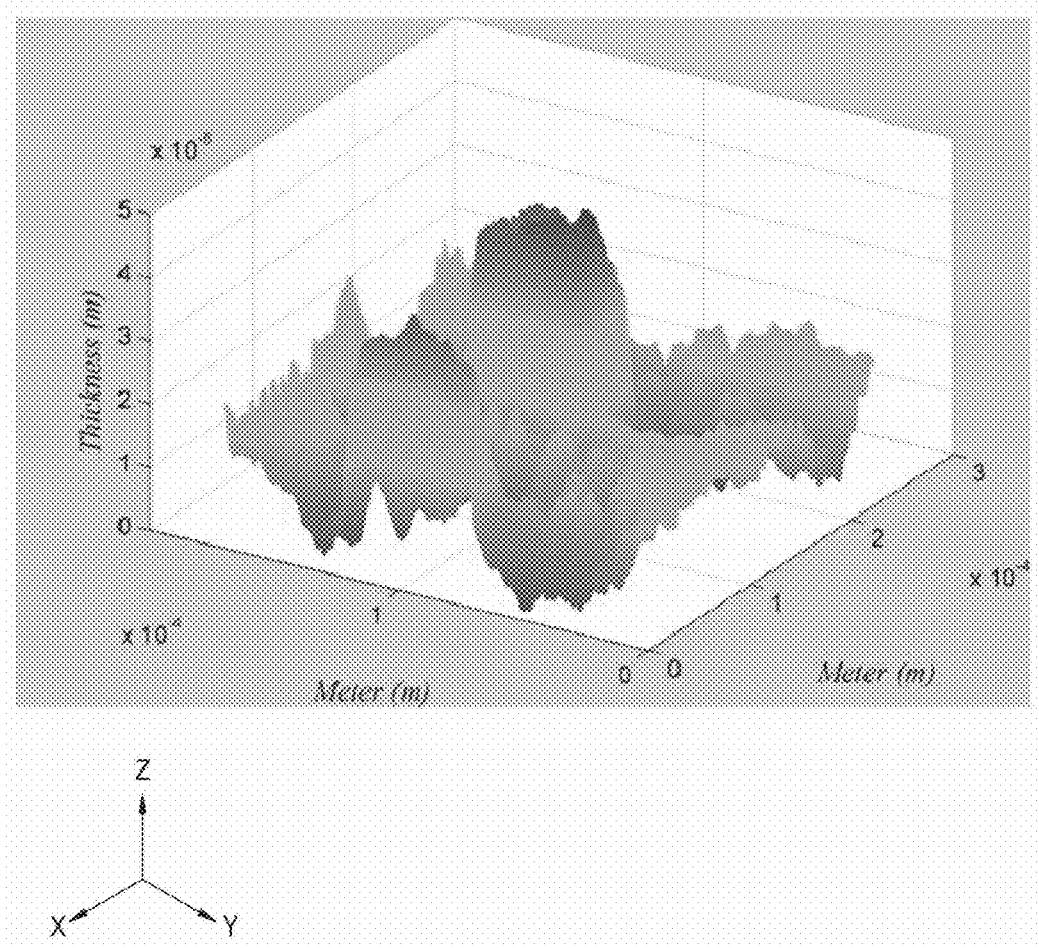
FIG. 11 is a diagram showing an example of the three-dimensional (3D) shape of an object to be measured, wherein the 3D shape is generated from a hologram.

The processor 90 may calculate a height of an object in the Z direction at the spot (x,y) from information reconstructed taking into account the reconstruction image plane, as shown in FIG. 11. FIG. 11 illustrates the 3D shape of two cuboid structures 51A and 51B of the object 50 to be measured.

Figure 12:
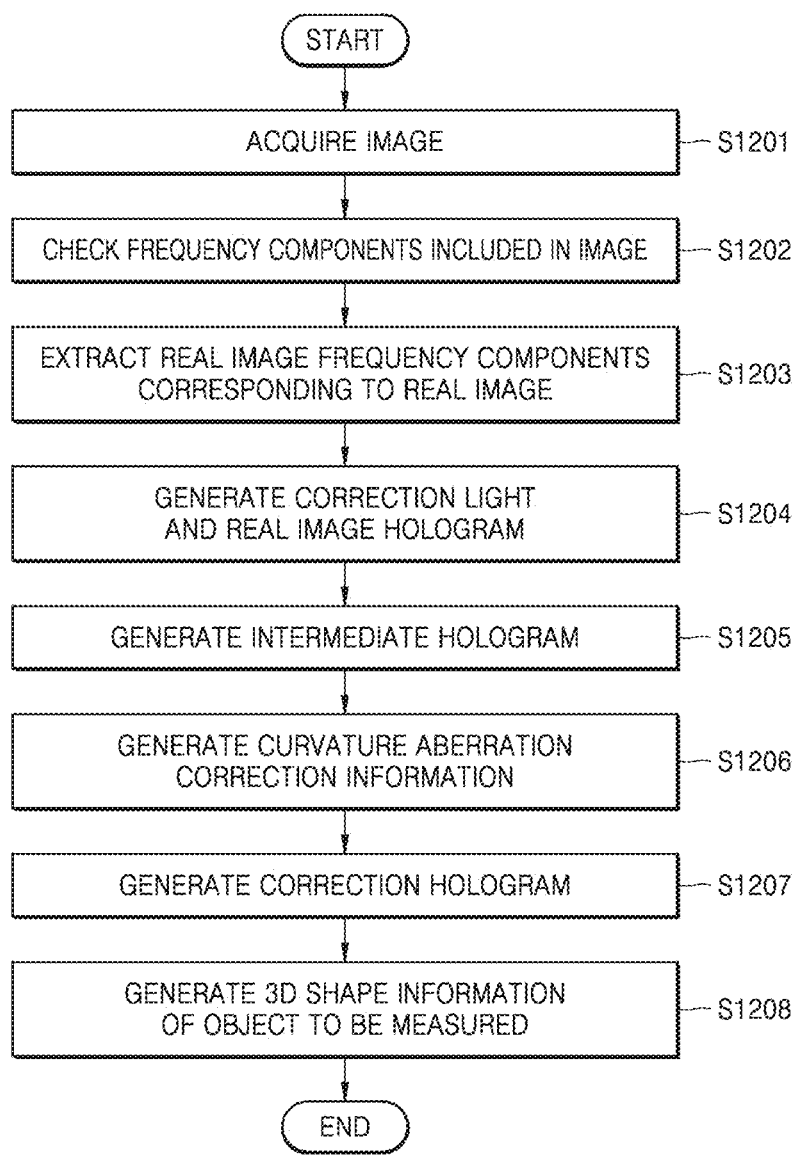
FIG. 12 is a flowchart of a method, performed by a holography reconstruction device, of generating 3D shape information of an object to be measured, according to an embodiment of the present disclosure.

FIG. 12 is a flowchart of a method, performed by the holography reconstruction device 1, of generating 3D shape information of the object 50 to be measured, according to an embodiment of the present disclosure. Hereinafter, redundant descriptions given with FIGS. 1 through 11 will be omitted, and description will be made with reference to FIGS. 1 through 11 together.

According to an embodiment, the holography reconstruction device 1 may acquire an image of the object 50 to be measured in operation S1201.

In the present disclosure, the "image" of the object 50 to be measured may include the intensity information (i.e., $|(U0(x,y,0)|^2)$ of the object hologram $U0(x,y,0)$ of the object 50 at each position and may be expressed as Equation 1 given above.

For example, the holography reconstruction device 1 may acquire the image shown in FIG. 4 with respect to a portion (e.g., including 51A and 51B) of the object 50 to be measured, which is illustrated in FIGS. 3A and 3B.

The image acquired by the holography reconstruction device 1 includes the intensity information of the object hologram $U0(x,y,0)$ at each position, as described above, and may thus be different from an image of the object 50 to be measured, which is usually acquired by the holography reconstruction device 1 (i.e., which is captured using only the object light O).

Referring to Equation 1, the object hologram $U0(x,y,0)$ may be generated by the interference between the object light O, which includes the phase information of the object 50 to be measured at each spot, and the reference light R, which does not include the phase information of the object 50 to be measured.

In addition to the phase information (i.e., the height information) of the object 50 to be measured at each spot (i.e., each spot (x,y)), the object hologram $U0(x,y,0)$ may further include an error caused by the aberration of the object light objective lens 40, noise (e.g., speckle noise resulting from the use of a photon of a laser), and the like.

Therefore, to remove the error and noise from the image acquired by the holography reconstruction device 1, the holography reconstruction device 1 may perform operations S1202 through S1207.

According to an embodiment, the holography reconstruction device 1 may check frequency components of the image acquired by the holography reconstruction device 1 in operation S1202. For example, the holography reconstruction device 1 may check the frequency components of the image by performing 2D Fourier transform on the image.

In other words, the holography reconstruction device 1 may check frequency components included in the image including the intensity information (i.e., $|(U0(x,y,0)|^2)$ of the object hologram $U0(x,y,0)$ at each position. At this time, the image may include a frequency component corresponding to a real image, a frequency component corresponding to an imaginary image, and a DC component.

Other various components than three types of components (i.e., the frequency component corresponding to a real image, the frequency component corresponding to an imaginary image, and the DC component) described above may also be included in the image. For example, frequency components involved in noise may also be included in the image. However, this is just an example, and embodiments are not limited thereto.

According to an embodiment, the holography reconstruction device 1 may extract components only corresponding to the real image from the checked frequency components in operation S1203. At this time, the holography reconstruction device 1 may extract the components corresponding to the real image in various ways.

For example, the holography reconstruction device 1 may extract components (hereinafter, referred to as peak components) having a peak value in terms of magnitude among the frequency components included in the image and may extract, as the components corresponding to the real image, components having a certain frequency difference or less from a peak component corresponding to the real image among the extracted peak components.

At this time, the holography reconstruction device 1 may determine the components corresponding to the real image based on the peak component corresponding to the real image in various ways. For example, the holography reconstruction device 1 may determine frequency components within a cross region around the peak component corresponding to the real image as the components corresponding to the real image. However, this is just an example, and embodiments are not limited thereto.

In a selective embodiment, the holography reconstruction device 1 may extract only the components corresponding to the real image among the frequency components included in the hologram, using an automatic real image spot-position extraction algorithm.

In the present disclosure, "extracting" a certain frequency component may refer to extracting the frequency of the certain frequency component and the magnitude (or intensity) of the certain frequency component.

Referring back to FIG. 5, the holography reconstruction device 1 may check the frequency components of the image acquired by the holography reconstruction device 1 and thus check various frequency components including the frequency component 911 corresponding to the real image, the frequency component 912 corresponding to the imaginary image, and the DC component 913.

The holography reconstruction device 1 may also extract only the frequency component 911 corresponding to the real image among the checked components. At this time, for example, the holography reconstruction device 1 may determine, as the components corresponding to the real image, the frequency components 911B within the cross region around the peak component 911A corresponding to the real image, as shown in FIG. 6.

According to an embodiment, the holography reconstruction device 1 may generate a digital reference light from the frequency components corresponding to the real image, which are extracted through the procedure described above, in operation S1204. In detail, the holography reconstruction device 1 may calculate a propagation direction and wavenumber of the digital reference light based on the frequency components corresponding to the real image. In other words, the holography reconstruction device 1 may calculate a wave vector of the digital reference light.

The holography reconstruction device 1 may also generate a digital reference light based on the propagation direction and wavenumber (or wave vector) of the digital reference light and may generate the correction light Rc(x,y) by obtaining the conjugate term of the digital reference light R(x,y) generated as shown in Equation 2.

The digital reference light R(x,y) and the correction light Rc(x,y) are in a conjugate relation with each other and may thus have the same intensity as shown in FIGS. 7A and 7C and have opposite phases to each other as shown in FIGS. 7B and 7D. Here, FIG. 7A is a diagram showing the intensity of the digital reference light R(x,y), FIG. 7B is a diagram showing the phase of the digital reference light R(x,y), FIG. 7C is a diagram showing the intensity of the correction light Rc(x,y), and FIG. 7D is a diagram showing the phase of the correction light Rc(x,y).

The correction light Rc(x,y) may be used to correct the real image hologram Um(x,y,0) described below.

Meanwhile, a "digital reference light" has the same properties as the reference light R generated from a single-wavelength light and may be a virtual light reconstructed by the holography reconstruction device 1 from the image acquired by the holography reconstruction device 1.

According to an embodiment, the holography reconstruction device 1 may generate a real image hologram based on the frequency components corresponding to the real image, which are extracted through the procedure described above, in operation S1204. For example, the holography reconstruction device 1 may generate the real image hologram of FIG. 8 by performing inverse 2D Fourier transform on the frequency components corresponding to the real image. At this time, the real image hologram may be expressed as Equation 3 given above.

According to an embodiment, the holography reconstruction device 1 may generate an intermediate hologram to generate the term Rca(x,y) related to curvature aberration correction in operation S1205. For example, the holography reconstruction device 1 may generate the intermediate hologram by multiplying the real image hologram Um(x,y,0) by the term Rc(x,y) related to a correction light. The generated intermediate hologram may be used to generate curvature aberration correction information in operation S1206.

According to an embodiment, the holography reconstruction device 1 may generate the 3D shape of the object 50 to be measured from the intermediate hologram, which is generated in operation S1205, and may generate the term Rca(x,y) related to curvature aberration correction from the 3D shape in operation S1206. In detail, the holography reconstruction device 1 may determine at least one parameter, which determines a curvature aberration correction term, from the 3D shape of the object 50 to be measured, which is generated from the intermediate hologram. At this time, the parameter may include, for example, coordinates of a center and a radius, which define the curved surface of a hemispherical shape.

Referring back to FIGS. 9 and 10, a method of determining a curvature aberration correction term from an intermediate hologram using the holography reconstruction device 1 according to an embodiment of the present disclosure will be described. For convenience of description, it is assumed that the holography reconstruction device 1 has acquired the image of the cuboid structure 51D and has generated the intermediate hologram of the cuboid structure 51D through the procedure described above. It is also assumed that the 3D shape 920 of the cuboid structure 51D, which is generated from the intermediate hologram of the cuboid structure 51D, is shown in FIG. 9.

Under those assumptions, the holography reconstruction device 1 according to an embodiment may determine at least one parameter, which determines the curvature aberration correction term, from the 3D shape 920. For example, as shown in FIG. 10, the holography reconstruction device 1 may determine, as parameters, the coordinate (Cx,Cy) of the center of the curved surface of the hemispherical shape and the radius "r" of the curved surface, from the curve of the cross-section of the 3D shape 920, taken along line I-I. At this time, the holography reconstruction device 1 may determine the position and/or direction of a cutting line, e.g., line I-I, such that the cutting line includes the center of the 3D shape 920 (i.e., the center of the hemispherical shape). In addition, the holography reconstruction device 1 may determine the cutting line, e.g., line I-I, to be parallel with the travelling direction of the object light O.

According to an embodiment, the holography reconstruction device 1 may generate (or determine) the curvature aberration correction term based on the at least one parameter determined through the above-described procedure. For example, the holography reconstruction device 1 may generate a curved surface in a 3D space with reference to the coordinate (Cx,Cy) of the center of the curved surface and the radius "r" of the curved surface and generate information to be reflected to phase correction of each spot (x,y) from the generated curved surface, thereby generating (or determining) the curvature aberration correction term.

In a selective embodiment, the holography reconstruction device 1 may determine a correction term from an intermediate hologram of an object to be measured, of which the shape is known, (e.g., an object having the same "z" value at any x and y coordinates).

In the case of the object to be measured, of which the shape is known, a "z" value at each spot (x,y) is given, and therefore, the holography reconstruction device 1 may determine the correction term by checking a difference in the "z" value at each spot (x,y) between the 3D shape of an object to be measured, which is generated from the intermediate hologram, and the known shape of the object to be measured. However, this is just an example, and embodiments are not limited thereto.

Accordingly, the holography reconstruction device 1 may generate the correction hologram Uc(x,y,0) from the real image hologram Um(x,y,0), taking into account an influence of the reference light R and an error caused by the aberration of the object light objective lens 40, in operation S1207. For example, the holography reconstruction device 1 may generate the correction hologram Uc(x,y,0) by multiplying the real image hologram Um(x,y,0) by the term Rc(x,y) related to a correction light and the term Rca(x,y) related to curvature aberration correction, as shown in Equation 4 given above. At this time, the term Rc(x,y) related to a correction light may be generated in operation S1204, and the term Rca(x,y) related to curvature aberration correction may be generated in operation S1206.

According to an embodiment, the holography reconstruction device 1 may generate 3D shape information of the object 50 to be measured based on the correction hologram Uc(x,y,0) in operation S1208. In other words, the holography reconstruction device 1 may calculate the height of an object in the Z direction at the spot (x,y)

For example, the holography reconstruction device 1 may convert the correction hologram Uc(x,y,0) into information of a reconstruction image plane. At this time, the reconstruction image plane refers to a virtual image display plane corresponding to a distance between the object 50 to be measured and the image sensor 80, which is calculated by the processor 90. The reconstruction image plane may be a virtual plane calculated and simulated by the holography reconstruction device 1.

The holography reconstruction device 1 may calculate a height of an object in the Z direction at the spot (x,y) from information reconstructed taking into account the reconstruction image plane, as shown in FIG. 11. FIG. 11 illustrates the 3D shape of two cuboid structures 51A and 51B of the object 50 to be measured.

Figure 13:
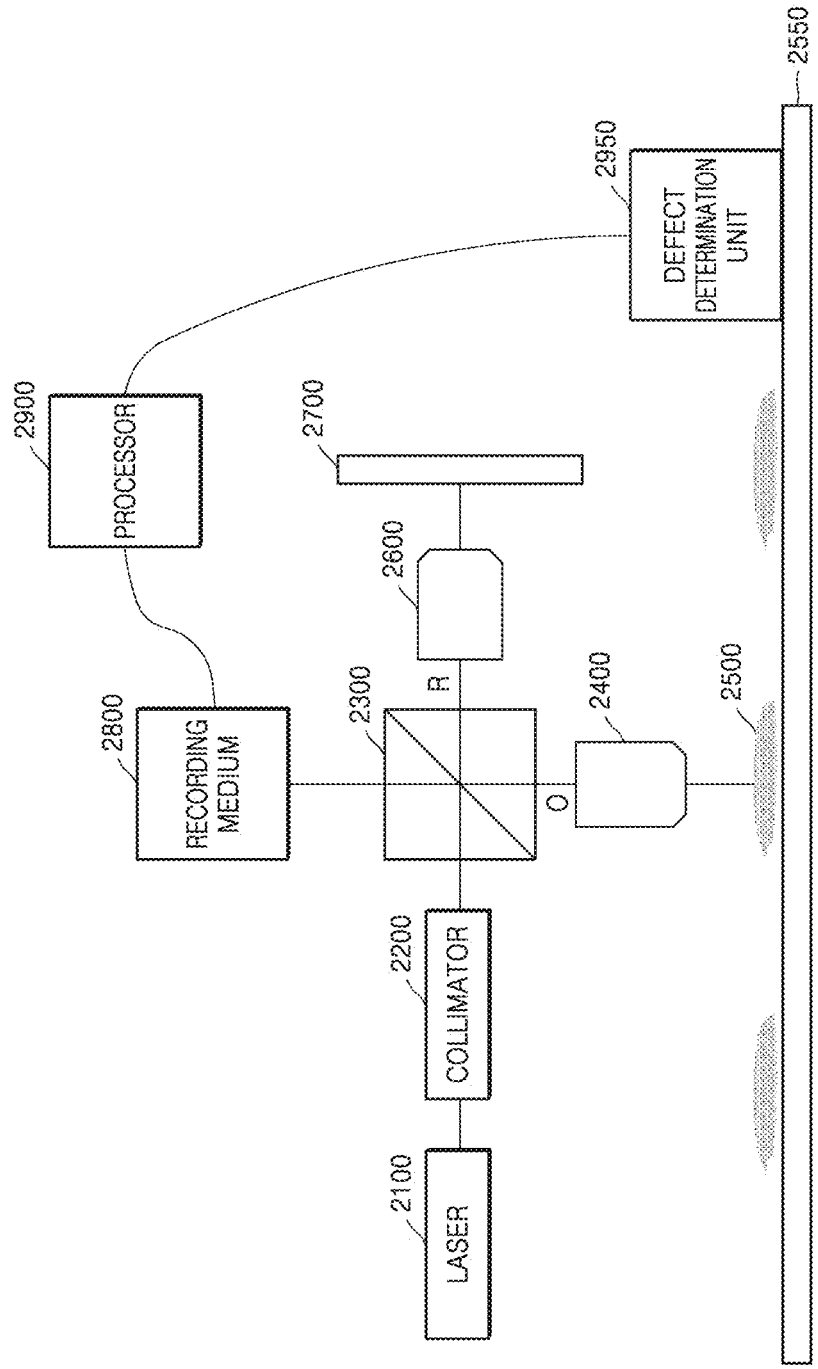
FIG. 13 is a diagram of a digital holographic microscope included in a hologram measuring unit of the present disclosure.

FIG. 13 is a diagram of a digital holographic microscope included in a hologram measuring unit of the present disclosure.

The digital holographic microscope may include a light source unit 2100 emitting a single-wavelength light, a collimator 2200 collimating the single-wavelength light emitted from the light source unit 2100, an optical splitter 2300 splitting the single-wavelength light passed through the collimator 2200 into the object light O and the reference light R, an object light objective lens 2400 passing the object light O from the optical splitter 2300, a reference light objective lens 2600 passing the reference light R from the optical splitter 2300, an optical mirror 2700 reflecting the reference light R passed through the reference light objective lens 2600, a recording medium 2800, and a processor 2900 receiving an image file, which is generated by converting an interference pattern from the recording medium 2800, and storing the image file. The recording medium 2800 records the interference pattern that is formed when the object light O, which has passed through the object light objective lens 2400 and then reflected from a surface of an object 2500 to be measured, and the reference light R, which has been reflected from the optical mirror 2700, are transmitted to the optical splitter 2300 after respectively passing through the object light objective lens 2400 and the reference light objective lens 2600.

The processor 2900 may extract reference light information of an object hologram from the object hologram acquired from the image file, generate a digital reference light, calculate a compensated object hologram using the object hologram and the digital reference light, extract phase information of the compensated object hologram, and reconstruct 3D information of the object 2500 to be measured.

The object 2500 to be measured by the microscope may be measured by the microscope through a moving rail 2550. A defect determination unit 2950 connected to the processor 2900 may determine existence or non-existence of a defect of the object 2500 using the compensated object hologram.

The processor 2900 may include a device, e.g., a microprocessor or a personal computer (PC), which may perform an arithmetic operation. The recording medium 2800 may include an image sensor, e.g., a CCD or a CMOS.

Information of an object hologram, which is acquired by the processor 2900, may include wavelength and phase information of an object and an aberration of the object light objective lens 2400 and may additionally include noise (e.g., speckle noise resulting from the use of a photon of a laser). The object hologram acquired by the processor 2900 may be a complex conjugate hologram and expressed as Equation 5:

$$|U0(x,y,0)|^2 = |O(x,y)|^2 + |R(x,y)|^2 + O^*(x,y)R(x,y) + O(x,y)R^*(x,y)$$ [Equation 5]

In Equation 5, x and y are spatial coordinates, U0(x,y,0) represents the acquired object hologram, O(x,y) and R(x,y) respectively represent the object light O and the reference light R, and O*(x,y) and R*(x,y) respectively represent the complex conjugate of the object light O and the complex conjugate of the reference light R.

Hereinafter, a method of generating a digital reference light and a compensated object hologram from the acquired object hologram will be described in detail.

The processor 2900 acquires an object hologram from the image file of the interference pattern recorded in the recording medium 2800. The acquired object hologram includes an interference pattern between the object light having phase information of an object and the reference light R not having the phase information of the object.

Thereafter, to extract information of the reference light R not having the phase information from the acquired object hologram, 2D Fourier transform is performed on the acquired object hologram. The frequency spectrum of the object hologram obtained through the 2D Fourier transform may be divided into spectrum information including a real image spot-position, spectrum information including an imaginary image spot-position, and spectrum information including DC information. Only real image spot-position information is extracted from the frequency spectrum using an automatic real image spot-position extraction algorithm. Reference light information of the acquired object hologram is extracted using the extracted real image spot-position.

Thereafter, the extracted reference light information of the processor 2900 may have phase discontinuity every 2σ due to the wave nature of light. To compensate for the phase discontinuity, a wavenumber constant of the extracted reference light information is calculated using a given wavenumber algorithm. A compensation term of the extracted reference light information is calculated using the wavenumber constant. The compensation term of the extracted reference light information, which is calculated from the wavenumber constant, is the conjugate of the acquired object hologram. The compensation term of the extracted reference light information is referred to as a digital reference light and expressed as Equation 6:

$$Rc(x,y) = \text{conj}[R(x,y)]$$ [Equation 6]

In Equation 6, Rc(x,y) is a digital reference light, R(x,y) is reference light information of an acquired object hologram, and "conj" is a function of obtaining the conjugate of a complex number.

Thereafter, the processor 2900 extracts aberration information from the object hologram to compensate the curvature aberration of the object light objective lens 2400 used to acquire the object hologram. Thereafter, the processor 2900 generates a curvature aberration information compensation term using an automatic frequency curvature compensation algorithm. Here, the curvature aberration information compensation term is referred to as digital curvature.

Thereafter, the processor 2900 calculates a compensated object hologram by multiplying the acquired object hologram by the compensation term of the extracted reference light information. This may be expressed as Equation 7:

$$UC(x,y,0)=O(x,y)R^*(x,y)RC(x,y)RCA(x,y) \quad \text{[Equation 7]}$$

In Equation 7, $UC(x,y,0)$ is the compensated object hologram, $O(x,y)$ and $R^*(x,y)$ are respectively an object light and a reference light of the acquired object hologram, $RC(x,y)$ is the digital reference light, and $RCA(x,y)$ is the digital curvature.

Thereafter, the processor 2900 converts the compensated object hologram into information of a reconstruction image plane using an angular spectrum propagation algorithm. Here, the reconstruction image plane refers to a virtual image display plane corresponding to a distance between the object 2500 to be measured and the recording medium 2800, which is calculated by the processor 2900. The reconstruction image plane may be calculated and simulated by the processor 2900. The processor 2900 extracts phase information of the compensated object hologram through inverse 2D Fourier transform. Because such extracted phase information results from removing light information and aberration information of an objective lens from an acquired object hologram, it will be noted that the extracted phase information of a compensated object hologram includes only phase information of an object.

Thereafter, the processor 2900 calculates quantitative thickness information of the object 2500 using the extracted phase information of the compensated object hologram. In this case, the extracted phase information of the compensated object hologram may include fine noise, e.g., speckle noise resulting from the use of a photon of a laser, and therefore, the processor 2900 may remove such fine noise before calculating the quantitative thickness information. In detail, the processor 2900 may compensate the extracted phase information of the compensated object hologram for distorted phase information, which is caused by fine noise and wrapped phase, using a 2D phase unwrapping algorithm. When the distorted phase information caused by fine noise and wrapped phase is removed, the quantitative thickness information of the object 2500 to be measured may be more precisely calculated based on the phase information of the compensated object hologram. The quantitative thickness information of the object 2500 to be measured, which has been calculated as described above, is expressed as Equation 8:

$$\Delta L=\lambda\Delta\varphi(x,y)/2\pi\Delta n(x,y) \quad \text{[Equation 8]}$$

In Equation 8, $\Delta L$ is the quantitative thickness information of the object 2500 to be measured; $\lambda$ is a wavelength of the light source unit 2100, which is used when the object hologram is acquired; $\rho(x,y)$ is the phase information of the compensated object hologram; and $\Delta n(x,y)$ is a refractive index difference between a background (or air) and the object 2500 to be measured. The processor 2900 may reconstruct the 3D shape of the object 2500 on the reconstruction image plane using the quantitative thickness information of the object 2500, which is calculated using Equation 8.

Figure 14:
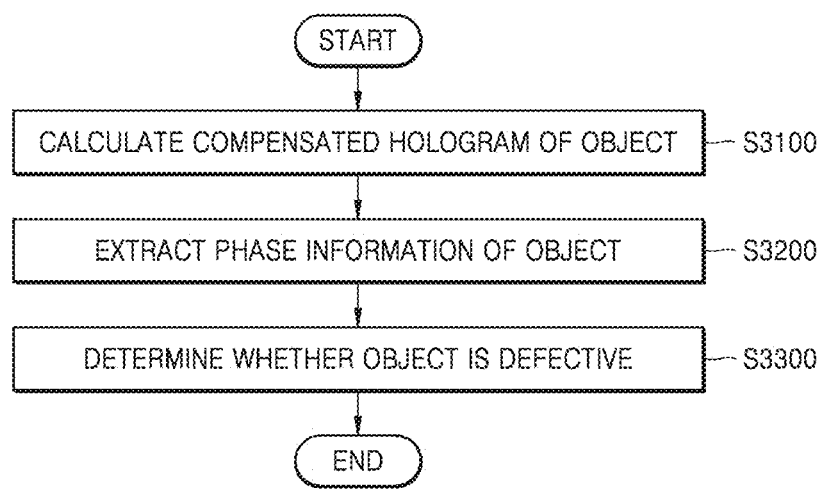
FIG. 14 is a flowchart of a defect detection method according to an embodiment of the present disclosure.

FIG. 14 is a flowchart of a defect detection method according to an embodiment of the present disclosure.

A defect detection device may calculate a compensated hologram of an object to be measured in operation S3100. The defect detection device may measure a hologram of the object before compensation, using the digital holographic microscope of FIG. 13.

In detail, according to an embodiment, the defect detection device may extract reference light information from the hologram of the object, calculate a wavenumber constant of the reference light information, and calculate a compensation term of the reference light information using the wavenumber constant, thereby generating a digital reference light. The defect detection device may also extract aberration information from the object hologram, generate digital curvature by compensating for the aberration based on the aberration information, and calculate the compensated object hologram by multiplying the object hologram by the compensation term of the reference light information.

The defect detection device may extract 3D phase information from the compensated object hologram in operation S3200. In detail, the defect detection device may convert the compensated object hologram into information of a reconstruction image plane using an angular spectrum propagation algorithm and extract phase information of the compensated object hologram using inverse 2D Fourier transform.

The extracted phase information is acquired by removing light information and aberration information of an objective lens from the object hologram and thus includes only phase information of the object.

Thereafter, the defect detection device may apply the extracted phase information to a phase image defect detection convolutional neural network, in which convolutional filters are grouped, to determine whether the object is defective in operation S3300.

According to an embodiment, the defect detection device may group the convolutional filters before determining whether the object is defective. Firstly, the defect detection device may receive design data of an object to be measured. The design data refers to 3D size data of the object and may include position data in a lateral (the X-Y plane) direction and an axial (thickness or Z axis) direction but is not limited to the position data. The design data may include various data such as volume and curvature.

The defect detection device may also receive a plurality of pieces of real data which have actually been determined as non-defective products or defective products. The defect detection device may receive a real numerical value of a non-defective product or a defective product in correspondence to design data. For example, when design data is 3D size data, the defect detection device may receive, as real data, 3D size data (i.e., lateral and axial position data) of a non-defective product or a defective product. For each of a non-defective product and a defective product, at least 5000 pieces of real data may be received, but embodiments are not limited thereto. A user of the defect detection device may distinguish a non-defective product from a defective product based on whether a product manufactured based on the design data functions normally.

After whether an object to be measured is defective is determined, the defect detection device may update the real data by including data of the object in the real data. In this case, as the number of determinations about existence or non-existence of a defect increases, the number of pieces of real data increases, and accordingly, accuracy of determination about existence or non-existence of a defect in an object to be measured also increases.

In addition, the defect detection device may compare the design data with each piece of real data and calculate similarity therebetween. The defect detection device may calculate overall similarity between the design data and the real data using a correlation function. The value of the similarity is expressed as 1 when the design data is identical to the real data and decreases and converges to 0 when the similarity decreases.

The defect detection device may check a coordinate value of a pixel, of which the similarity is out of an arbitrary error range. The coordinate value refers to characteristic determining position coordinates. In detail, in the case where the design data is determined to be non-defective even when the similarity of the design data is out of the error range, characteristic determining position coordinates correspond to the coordinates of a pixel out of the error range. Thereafter, when an object to be measured corresponds to the characteristic determining position coordinates, the object is highly likely to be determined to be non-defective.

Meanwhile, in the case where the design data is determined to be defective when the similarity of the design data is out of the error range, characteristic determining position coordinates also correspond to the coordinates of a pixel out of the error range. Thereafter, when an object to be measured corresponds to the characteristic determining position coordinates, the object is highly likely to be determined to be defective.

In addition, the defect detection device may determine a convolutional filter using information of the characteristic determining position coordinates. In detail, the defect detection device may determine a convolutional filter having a certain size by categorizing the information of the characteristic determining position coordinates in lateral and axial directions. The size of the convolutional filter may correspond to a 3×3 matrix, and the defect detection device may determine each convolutional filter using real data about at least 5000 non-defective products and at least 5000 defective products. Because the convolutional filter includes a characteristic of a non-defective or defective product, a value of the convolutional filter may be determined reflecting the characteristic.

When all convolutional filters are applied to the 3D phase information, whether the object is defective may also be identified. However, when the number of pieces of real data increases to increase the accuracy of determination, the amount of operations of the defect detection device rapidly increases, thereby slowing an operating speed. Therefore, the defect detection device may group convolutional filters having similar characteristics. The grouping may be performed by an algorithm usually used in a convolutional neural network. The defect detection device may efficiently apply a convolutional filter by using the grouping when determining about existence or non-existence of a defect.

The defect detection device may apply the phase information to filters grouped by similar characteristics. The defect detection device may generate a convolutional layer by applying a value, which results from the application of a filter, to the ReLu function. The convolutional layer may include values obtained by applying the phase information to convolutional filters. The values may represent the characteristics of a non-defective or defective product. The ReLu function may be expressed as Equation 9:

$$ReLu(x) = \begin{cases} 0 & \text{if } x < 0 \\ x & \text{if } x \geq 0 \end{cases}$$ [Equation 9]

The defect detection device may also combine the convolutional layer with the Softmax function to determine whether the object is defective. The Softmax function may be expressed as Equation 10:

$$Softmax_n(x) = \frac{e^{x_n}}{\sum_{k=1}^{N} e^{x_k}}, n \in \{1, 2, 3, \ldots, N\}$$ [Equation 10]

Inputs of the Softmax function are the values of the convolutional layer, and N is the number of outputs. Because the Softmax function may express the frequency of an input value as a probability, the defect detection device may determine about existence or non-existence of a defect based on a characteristic corresponding to a maximum value among the result values of the Softmax function. Such procedure for determining whether an object is defective will be described in detail with reference to FIG. 15 below.

A neural network realized by applying the Softmax function to a convolutional layer generated by applying the phase information to grouped convolutional filters is referred to as a phase image defect detection convolutional neural network.

The defect detection device may determine whether a 3D object is defective through the neural network. While devices according to the related art may determine about existence or non-existence of a defect only on a 2D plane, the present disclosure may detect a 3D defect of an object to be measured by using a 3D hologram.

Figure 15:
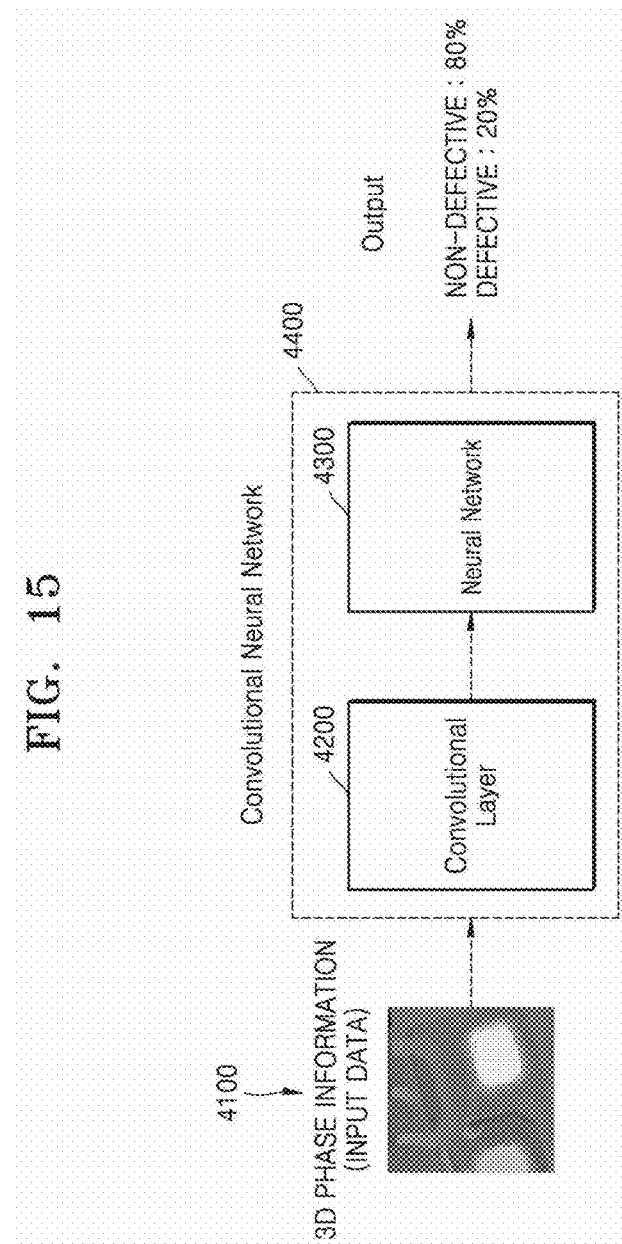
FIG. 15 is a diagram showing a method of determining a defect through the realization of a phase image defect detection convolutional neural network, according to an embodiment of the present disclosure.

FIG. 15 is a diagram showing a method of determining a defect through the realization of a phase image defect detection convolutional neural network, according to an embodiment of the present disclosure.

The defect detection device may input 3D phase information 4100 to the phase image defect detection convolutional neural network. The 3D phase information 4100 may be extracted from the compensated object hologram in operation S3200. According to embodiments, a defect may be detected using a 3D image instead of a 2D image according to the related art, and therefore, particularly a defect in an axial direction (i.e., the height or thickness direction of an object) may be detected.

When the 3D phase information 4100 is input to a convolutional neural network 4400, the defect detection device may determine whether a measured object is defective. In detail, the defect detection device may apply convolutional filters grouped by similar characteristics to the 3D phase information 4100. The defect detection device may generate a convolutional layer 4200 by applying a value, which results from the application of each convolutional filter, to the ReLu function. The defect detection device may realize a neural network 4300 by combining the convolutional layer 4200 with the Softmax function to determine whether the object is defective. The neural network 4300 realized by combining the convolutional layer 4200 with the Softmax function may be referred to as a convolutional neural network 4400. The convolutional neural network 4400 is called a phase image defect detection convolutional neural network. The phase image defect detection convolutional neural network generating method may be included in operation S3300 in FIG. 14.

A method of determining about defectiveness using the neural network will be described below. Every result of the convolutional layer 4200 is a positive number due to the ReLu function. The result value is a number representing the characteristic of a non-defective or defective product. When all result values are input to the Softmax function, the probability of result values having the characteristic of a non-defective product and the probability of result values having the characteristic of a defective product may be given.

A result determined by the convolutional neural network 4400 is "non-defective" or "defective", each being expressed as a probability. For example, when the probability of being non-defective is 0.8 and the probability of being defective is 0.2, an object measured by the defect detection device may be determined as non-defective.

Figure 16:
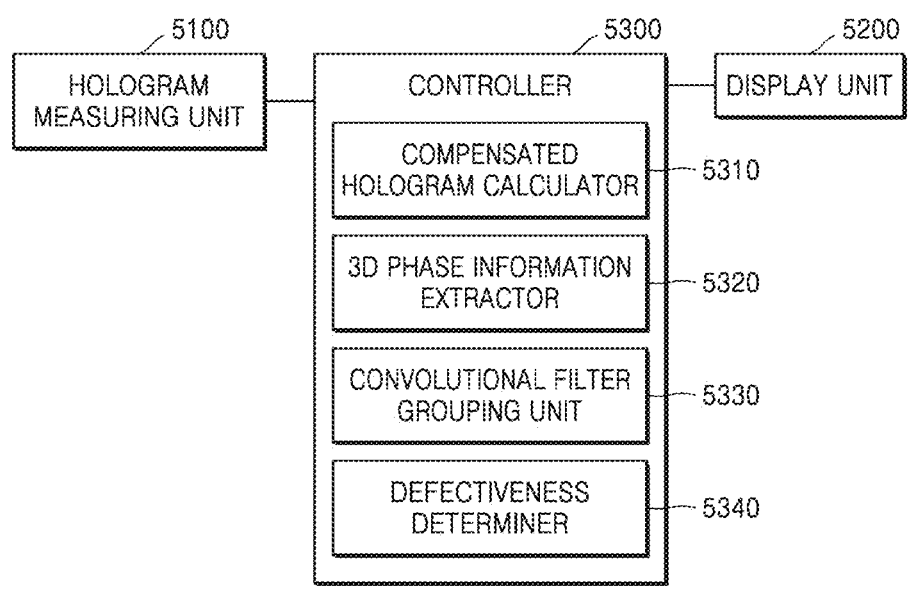
FIG. 16 is a block diagram of the inner structure of a defect detection device according to an embodiment of the present disclosure.

FIG. 16 is a block diagram of the inner structure of a defect detection device according to an embodiment of the present disclosure. As described in detail below, the defect detection device may include a hologram measuring unit 5100, a display unit 5200, and a controller 5300.

The hologram measuring unit 5100 of the defect detection device may measure a hologram of an object to be measured. To measure a hologram, the hologram measuring unit 5100 may include a digital holographic microscope. The digital holographic microscope has been described with reference to FIG. 13 above, and thus detailed description thereof will be omitted.

The display unit 5200 of the defect detection device may include a display, which may display characteristic information of the object and whether the object is defective.

The controller 5300 of the defect detection device may control all operations of the defect detection device. The controller 5300 may include a compensated hologram calculator 5310 calculating a compensated hologram from an object's hologram measured by the hologram measuring unit 5100, a 3D phase information extractor 5320 extracting 3D phase information from the compensated hologram, a convolutional filter grouping unit 5330 determining a convolutional filter based on design data and real data about at least one non-defective or defective product and grouping convolutional filters having similar characteristics, and a defectiveness determiner 5340 determining whether the object is defective using a phase image defect detection convolutional neural network.

The compensated hologram calculator 5310 may calculate a compensated hologram from an object's hologram measured by the hologram measuring unit 5100. The method of calculating a compensated hologram has been described in detail with reference to FIG. 13 above.

The 3D phase information extractor 5320 may extract 3D phase information from the compensated hologram. To extract 3D phase information from the compensated hologram, the 3D phase information extractor 5320 may perform 2D Fourier transform. The detailed extracting method has been described with reference to FIG. 13 above.

The convolutional filter grouping unit 5330 may determine a convolutional filter based on design data and real data about at least one non-defective or defective product and group convolutional filters having similar characteristics. When whether an object to be measured is defective is determined, the convolutional filter grouping unit 5330 may determine a convolutional filter based on measurement data of the object and add the determined the convolutional filter to the group of convolutional filters. Accordingly, when the defect detection device determines existence or non-existence of a defect, the group of convolutional filters may be updated.

The method of determining a convolutional filter and grouping convolutional filters has been described in operation S3300 in FIG. 14.

The defectiveness determiner 5340 may generate a convolutional layer by applying the group of convolutional filters to the phase information and realize a phase image defect detection convolutional neural network to determine whether the object is defective. The defectiveness determiner 5340 may generate the convolutional layer by applying the ReLu function to a value, which results from applying each convolutional filter to the phase information, and combine the convolutional layer with the Softmax function, thereby realizing the phase image defect detection convolutional neural network.

The method of determining whether the object is defective has been described with reference to operation S3400 in FIG. 14 and FIG. 15.

An embodiment of the present disclosure can also be embodied as a computer program executed on a computer using various elements. The computer program may be recorded in a computer-readable medium. At this time, the medium may store a computer-executable program. Examples of the medium may include magnetic media such as hard disks, floppy disks, and magnetic tapes; optical image sensors such as CD-ROMs and DVDs; magneto-optical media such as floptical disks; and media such as read-only memory (ROM), random-access memory (RAM), and flash memory that are configured to store program instructions.

Meanwhile, the computer program may be specially designed and configured for the present disclosure or may have been known to and usable by those skilled in the field of computer software. Examples of the computer program may include machine codes created by a compiler and high-level language codes that can be executed in a computer using an interpreter.

The particular implementations shown and described herein are illustrative examples of embodiments and are not intended to otherwise limit the scope of embodiments in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item of element is essential to the practice of embodiments unless the element is specifically described as "essential" or "critical."

Therefore, the spirit of the present disclosure is not limited to the embodiments described above, and the scope of the appended claims and equivalents to the scope or equivalently changed scopes will be construed as being included in the scope of the spirit of the present disclosure.

What is claimed is:

1. A method of generating three-dimensional (3D) shape information of an object to be measured from an image including intensity information of an object hologram generated by interference between a reference light reflected from an optical mirror and an object light affected by the object, the method comprising:

checking at least one frequency component included in the image;

extracting real image components corresponding to a real image from the at least one frequency component;

generating a correction light and a real image hologram based on the real image components, the correction light being in a conjugate relation with the reference light and the real image hologram including real image information of the object;

generating an intermediate hologram based on the correction light, the intermediate hologram resulting from removing information of the reference light from the real image hologram;

generating curvature aberration correction information from the intermediate hologram;

generating a correction hologram based on the curvature aberration correction information, the correction hologram resulting from removing an error caused by a curvature aberration from the intermediate hologram; and generating the 3D shape information of the object from the correction hologram.

2. The method of claim 1, wherein the generating of the curvature aberration correction information includes:

generating 3D shape information of the object from the intermediate hologram;

determining at least one parameter based on the 3D shape information of the object, which is generated from the intermediate hologram, the at least one parameter determining the curvature aberration correction information; and generating the curvature aberration correction information based on the at least one parameter.

3. The method of claim 2, wherein the 3D shape information of the object, which is generated from the intermediate hologram, includes at least a portion of a curved surface of a hemispherical shape, and the determining of the at least one parameter includes:

determining coordinates of a center of the curved surface of the hemispherical shape from the at least portion of the curved surface of the hemispherical shape; and determining a radius of the curved surface of the hemispherical shape from the at least portion of the curved surface of the hemispherical shape.

4. The method of claim 3, wherein the determining of the at least one parameter further includes generating a cross-section cutting the curved surface of the hemispherical shape, the determining of the coordinates of the center includes determining the coordinates of the center from a curve generated on the cross-section by the curved surface of the hemispherical shape, and the determining of the radius of the curved surface includes determining the radius from the curve.

5. The method of claim 4, wherein the cross-section is parallel with a traveling direction of the object light.

6. An apparatus comprising a processor configured to perform the method of claim 1.

7. The apparatus of claim 6, further comprising an image sensor configured to acquire the image to be processed by the processor.

8. A non-transitory computer readable recording medium storing instructions to perform the method of claim 1.

9. A system for generating three-dimensional (3D) shape information of an object to be measured from an image including intensity information of an object hologram generated by interference between a reference light reflected from an optical mirror and an object light affected by the object, the system comprising:

means for checking at least one frequency component included in the image;

means for extracting real image components corresponding to a real image from the at least one frequency component;

means for generating a correction light and a real image hologram based on the real image components, the correction light being in a conjugate relation with the reference light and the real image hologram including real image information of the object;

means for generating an intermediate hologram based on the correction light, the intermediate hologram resulting from removing information of the reference light from the real image hologram;

means for generating curvature aberration correction information from the intermediate hologram;

means for generating a correction hologram based on the curvature aberration correction information, the correction hologram resulting from removing an error caused by a curvature aberration from the intermediate hologram; and means for generating the 3D shape information of the object from the correction hologram.

* * * * *